(12) United States Patent
Akaike et al.

(10) Patent No.: US 9,015,111 B2
(45) Date of Patent: Apr. 21, 2015

(54) STORAGE SYSTEM AND STORAGE SYSTEM CONTROL METHOD

(71) Applicant: Hitachi, Ltd., Tokyo (JP)

(72) Inventors: Hirotoshi Akaike, Tokyo (JP); Kazuhisa Fujimoto, Tokyo (JP); Kohei Tatara, Tokyo (JP); Katsuya Tanaka, Tokyo (JP); Makio Mizuno, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/234,236

(22) PCT Filed: Apr. 5, 2013

(86) PCT No.: PCT/JP2013/060448
§ 371 (c)(1),
(2) Date: Jan. 22, 2014

(87) PCT Pub. No.: WO2014/162586
PCT Pub. Date: Oct. 9, 2014

(65) Prior Publication Data
US 2015/0052176 A1 Feb. 19, 2015

(51) Int. Cl.
G06F 7/00 (2006.01)
G06F 17/30 (2006.01)
G06F 11/10 (2006.01)

(52) U.S. Cl.
CPC .... *G06F 17/30091* (2013.01); *G06F 17/30132* (2013.01); *G06F 11/1076* (2013.01); *G06F 17/30327* (2013.01); *G06F 17/302* (2013.01)

(58) Field of Classification Search
None
See application file for complete search history.

(56) References Cited

U.S. PATENT DOCUMENTS

| | | | | |
|---|---|---|---|---|
| 6,332,140 B1* | 12/2001 | Rhine | | 1/1 |
| 6,389,432 B1* | 5/2002 | Pothapragada et al. | | 1/1 |
| 7,353,334 B2* | 4/2008 | Horn et al. | | 711/113 |
| 7,599,941 B2* | 10/2009 | Bahar et al. | | 1/1 |
| 2002/0083270 A1 | 6/2002 | Chilton | | |
| 2002/0095547 A1* | 7/2002 | Watanabe et al. | | 711/114 |
| 2006/0215682 A1 | 9/2006 | Chikusa et al. | | |
| 2007/0255925 A1 | 11/2007 | Serizawa et al. | | |
| 2008/0184000 A1 | 7/2008 | Kawaguchi | | |
| 2009/0240910 A1 | 9/2009 | Inomata et al. | | |
| 2009/0271540 A1 | 10/2009 | Hirayama | | |
| 2010/0274935 A1 | 10/2010 | Hirayama | | |

FOREIGN PATENT DOCUMENTS

| | | |
|---|---|---|
| JP | 2005-011316 A | 1/2005 |
| JP | 2006-252019 A | 9/2006 |
| JP | 2008-186172 A | 8/2008 |
| JP | 2009-230381 A | 10/2009 |
| JP | 2009-266119 A | 11/2009 |

* cited by examiner

*Primary Examiner* — Michael Hicks
(74) *Attorney, Agent, or Firm* — Mattingly & Malur, P.C.

(57) ABSTRACT

Data transfer between storage apparatuses is reduced, and performance of data access of a storage system is improved. In a case where a processor of a first storage apparatus receives a write request from a host computer as a request for data access to a virtual volume and a cache memory of any of the storage apparatuses is not allocated to a virtual storage area in the virtual volume designated by the data access request, the processor of the first storage apparatus selects a second storage apparatus and a third storage apparatus among candidates satisfying a predetermined state condition among the storage apparatuses based on connection information indicating connection between the storage apparatuses through a communication line.

15 Claims, 30 Drawing Sheets

FIG.5

| RAID group number | RAID level | HDD number list | HDD size |
|---|---|---|---|
| 0 | 5 | 0,1,2,3 | 40GB |
| 1 | 6 | 4,5,6,7,8,9,10,11 | 100GB |
| 2 | 10 | 12,13,14,15 | 100GB |
| 3 | N/A | N/A | N/A |
| 4 | 10 | 32,33,34,35 | 20GB |
| 5 | 10 | 40,41,42,43 | 300GB |
| 6 | 5 | 64,65,66,67 | 40GB |

Columns: 0405, 0410, 0415, 0420 — Table: 0220

RAID group management table

Volume management table

FIG.7

| Beginning address | RAID group number | Storage destination BE node number | Allocation destination address | Storage destination CM node number | Reservation destination BE node number |
|---|---|---|---|---|---|
| 0x0000 | 10 | 3 | 0x40000 | 1 | N/A |
| 0x0100 | 14 | 8 | 0x0200 | 2 | N/A |
| 0x0200 | 18 | 6 | 0x0000 | 3 | N/A |
| 0x0300 | N/A | N/A | N/A | N/A | N/A |
| 0x0400 | N/A | N/A | N/A | 2 | 2 |

Virtual volume allocation management table

FIG.8

| Capacity pool number | Existence of capacity pool production | Free space |
|---|---|---|
| 0 | Exist | 100MB |
| 1 | Exist | 200MB |
| 2 | Not exist | N/A |

0705 0710 0715

0235

| RAID group number | Capacity pool number | Non-allocated area information |
|---|---|---|
| 10 | 0 | 0x0000-0xFFFF |
| 11 | 1 | 0x0000-0xFFFF |
| 12 | 0 | 0x4200-0xFFFF |
| 13 | N/A | N/A |
| 14 | 0 | 0x0000-0xFFFF |

0720 0725 0730

Capacity pool configuration management table

FIG.9

| Capacity pool number | RAID group number | Allocated area | Reserved area | Free space | Total area |
|---|---|---|---|---|---|
| 0 | 10, 12 | 1900MB | 20MB | 80MB | 2000MB |
| 1 | N/A | N/A | N/A | N/A | N/A |
| 2 | N/A | N/A | N/A | N/A | N/A |

0805  0810  0815  0820  0825  0830

0240

BE node configuration management table

FIG.12

| CM node | BE node / Free Load | 1 Not exist | 2 Exist | 3 Exist | ... | 8 Exist |
|---|---|---|---|---|---|---|
| 1 | High | 0 | 1 | 1 | ... | 2 |
| 2 | Low | 2 | 1 | 2 | ... | 3 |
| 3 | High | 2 | 2 | 1 | ... | 2 |
| ... | ... | ... | ... | ... | ... | ... |
| 8 | Low | 4 | 4 | 3 | ... | 2 |

FIG.15

| Access type | Cache memory | Allocation of drive area | Command type ||
| --- | --- | --- | --- | --- |
| | | | Read | Write |
| Data Transmission amount is large | Hit | Not exist | Normal Read control process | First high-speed Write control process | 0930
| | | Exist | Normal Read control process | Normal Write control process |
| | Miss | Not exist | Normal Read control process | Second high-speed Write control process | 0935
| | | Exist | High-speed Read control process 0925 | Third high-speed Write control process | 0940
| Data Transmission amount is small | | - | Normal IO control process ||

IO control determination condition 0900

STORAGE SYSTEM AND STORAGE SYSTEM CONTROL METHOD

TECHNICAL FIELD

The present invention relates to a technique using a plurality of storage apparatuses.

BACKGROUND ART

In a storage system having a cluster configuration where a plurality of storage nodes are collected, the storage nodes are driven in parallel so that high performance of data access can be implemented due to parallel access and high availability can be implemented due to data redundancy. Hereinafter, in description and drawings, the storage node may be referred to as a node.

Recently, a data transfer amount between nodes is increased according to an increase in the number of nodes, and performance of the storage system is deteriorated because of a lack of a band of a network which couples the nodes. Methods of solving the problem are known as follows.

In a first method, a local cache is used (for example, PTL 1). In this method, in a cluster configuration where a plurality of storage apparatuses (nodes) are coupled through a network, when a data write request from a host is received, data are temporarily stored in the local cache. The local cache denotes a cache in a node having write destination volume. Since data are temporarily stored in the local cache, the number of times of data transfer through the network from the cache to the write destination volume is reduced, so that the data transfer amount between the nodes is suppressed.

In a second method, a dynamic capacity allocating function is used (for example, PTL 2 and PTL 3). The dynamic capacity allocating function is implemented by a capacity pool configured by collecting storage areas of a storage node and a virtual volume. The virtual volume denotes a volume having no physical storage capacity. In the dynamic capacity allocating function, a node receiving a data write request allocates a portion of a capacity space of the capacity pool as a storage area to storage destination sites of write data in the virtual volume when data writing in the virtual volume occurs. In this case, in the node receiving the data write request, the storage area is allocated, and data are stored in the allocated storage area, so that the number of times of data transfer through the network is reduced, so that the data transfer amount between the nodes is suppressed.

CITATION LIST

Patent Literature

[PTL 1]
US Patent Application Laid-Open No. 2002/0083270
[PTL 2]
Japanese Patent Application Laid-Open No. 2008-186172
[PTL 3]
Japanese Patent Application Laid-Open No. 2005-11316

SUMMARY OF INVENTION

Technical Problem

Although use of the virtual volume capable of increasing flexibility of management is widespread, if the above-described first method is applied to a storage system having the virtual volume, it is difficult to suppress the data transfer amount between the nodes as an advantage of the first method. Namely, in the storage system having the virtual volume, according to the first method, since a cache is allocated to the node having the virtual volume of the write destination, there may be a case where a cache may be allocated to a node different from the node (BE node: back-end node) having a data storage medium which is to be a final storage destination of data. Therefore, although a local cache is allocated, there may be a case where no storage area exists in the local. Therefore, data transfer occurs between a node (CM node: cache memory node) which includes a cache and the BE node, and thus, the network band becomes insufficient due to the data transfer, so that there may be a case where performance of the storage system is deteriorated.

In the above-described second method, the storage area of the data storage medium in the node (host node) receiving data from a host computer is allocated to the storage destination sites of write data in the virtual volume. Therefore, the host node and the node (BE node) which includes the data storage medium can be configured by the same node. However, in some cases, the node (CM node) which includes the cache is different from the host node. Therefore, data transfer between the host node and the CM node and data transfer between the CM node and the BE node occur, and thus, the network band becomes insufficient due to the data transfer, so that performance of the storage system may be deteriorated.

Solution to Problem

In order to solve the above-described problem, according to an aspect of the present invention, there is provided a storage system including at least three storage apparatuses. Each of the storage apparatuses includes a processor coupled through a communication line to at least one of different storage apparatuses, a cache memory coupled to the processor, and a storage device coupled to the processor. The processor of the first storage apparatus among the storage apparatus is coupled to a host computer to supply a virtual volume to the host computer. In a case where the processor of the first storage apparatus receives a write request from the host computer as a request for data access to the virtual volume and the cache memory of any of the storage apparatuses is not allocated to a virtual storage area in the virtual volume designated by the data access request, the processor of the first storage apparatus writes write data designated by the data access request in the cache memory of a second storage apparatus among the storage apparatuses and selects the second storage apparatus and a third storage apparatus among candidates satisfying a predetermined state condition among the storage apparatuses based on connection information indicating connection between the storage apparatuses through the communication line in order to write the write data written in the cache memory of the second storage apparatus in the storage device of the third storage apparatus of the storage apparatuses.

Advantageous Effects of Invention

According to the aspect of the present invention, the data transfer between the storage apparatuses is reduced, so that performance of data access of the storage system can be improved.

BRIEF DESCRIPTION OF DRAWINGS

FIG. 5 illustrates a configuration of a RAID group management table 0220.

FIG. 7 illustrates a configuration of a virtual volume allocation management table 0230.

FIG. 8 illustrates a configuration of a capacity pool configuration management table 0235.

FIG. 9 illustrates a configuration of a BE node configuration management table 0240.

FIG. 12 illustrates a configuration of a write evaluation value table 1200.

FIG. 15 illustrates an IO control determination condition.

DESCRIPTION OF EMBODIMENTS

Figure 1:
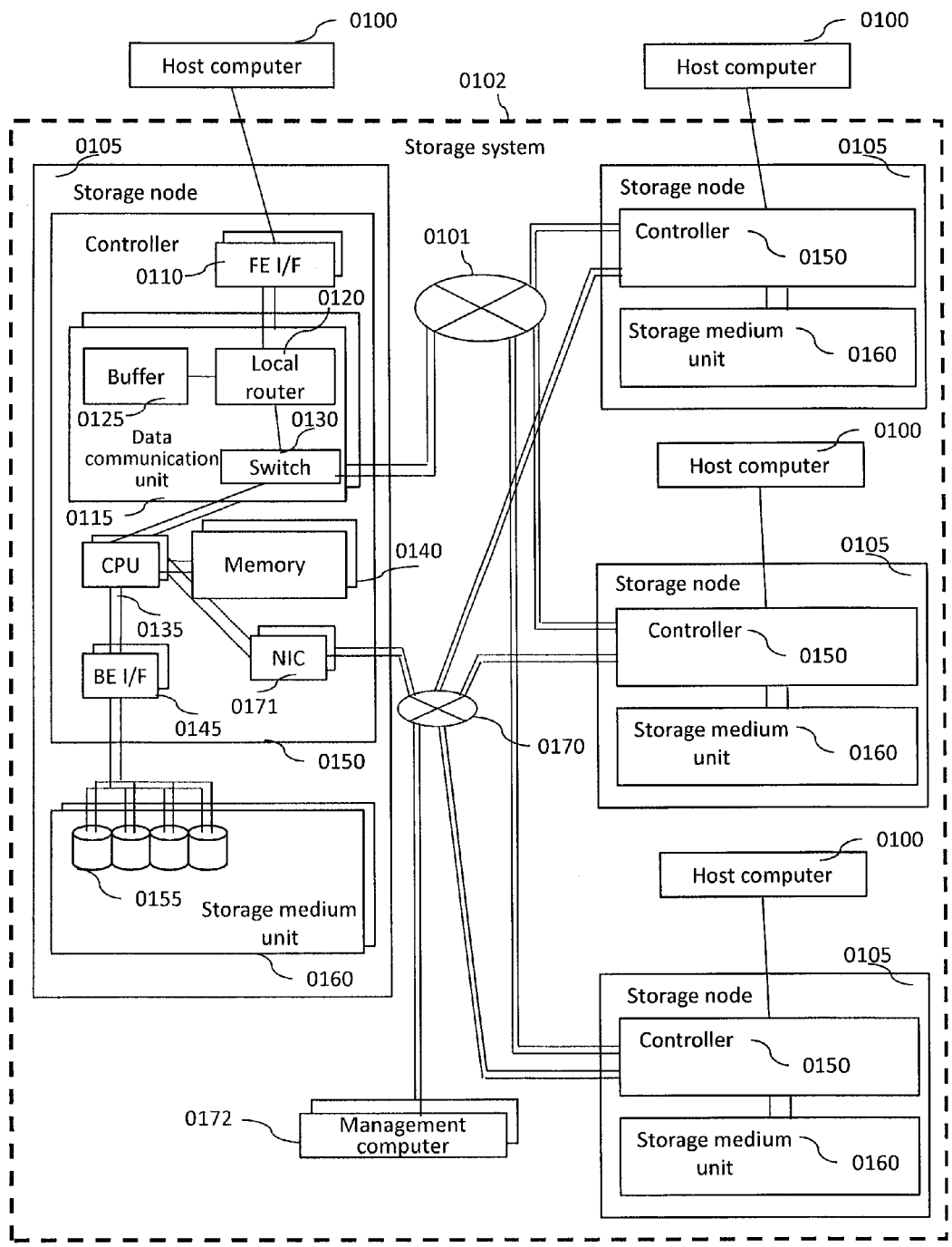
FIG. 1 illustrates a configuration of a computer system according to an embodiment of the present invention.

Hereinafter, embodiments of the present invention will be described with reference to the drawings.

In addition, in the description hereinafter, information in the present invention is described by the expression of "aaa table", "aaa list", "aaa DB", and "aaa queue", or the like. However, the information may be expressed with data structures other than the data structures of a table, a list, a DB, a queue, and the like. Therefore, in order to indicate that the information does not depend on a data structure, "aaa table", "aaa list", "aaa DB", "aaa queue" or the like may be referred to as "aaa information".

In addition, in the description of contents of each information, the terms "identification information", "identifier", "title", "name", "ID", "number", and the like are used. However, these terms can be substituted among each other.

In the description hereinafter, in some expressions, a "program" may be described as a subject. However, since the program performs a process which is defined to be performed by a processor by using a memory or a communication port (a communication control device), the processor of a storage apparatus may be described as a subject. In addition, a process disclosed by using the program as a subject may be a process performed by a computer such as a management computer. In addition, a portion or all of the programs may be implemented by using dedicated hardware.

In addition, various programs may be installed in each computer by a program distribution server or a computer-readable storage medium.

In addition, the management calculator (management computer) includes an input/output device. As an example of the input/output device, a display, a keyboard, and a pointer device are considered, but other devices may be used. In addition, as a substitute for the input/output device, a serial interface or an Ethernet interface may be used as the input/output device. The interface is coupled to a computer for display having a display, a keyboard, or a pointer device. Information for display is transmitted to the computer for display, or information for input is received from the computer for display, so that displaying may be performed or input may be received by the computer for display in order to substitute for displaying and inputting in the input/output device.

Hereinafter, in some cases, a set of at least one computer of the present invention which manages the storage system and display the information may be referred to as a management system. In a case where the management computer displays information for display, the management computer is a management system, and a combination of the management computer and the computer for display is also a management system. In addition, in order to achieve high speed and high reliability in a management process, processes similar to the management computer may be implemented using a plurality of computers. In this case, the plurality of computers (also including a computer for display in a case where display is performed by the computer for display) is a management system.

First Embodiment

In the embodiment, a case where a plurality of host computers do not share a virtual volume will be described.

Hereinafter, a configuration of a computer system according to the embodiment of the present invention will be described.

FIG. 1 illustrates a configuration of a computer system according to the embodiment of the present invention.

The computer system is configured to include a plurality of host computers 0100 and a storage system 0102. The storage system 0102 is configured to include a plurality of storage nodes 0105 and a management computer 0172. The plurality of storage nodes 0105 are coupled to the plurality of host computers 0100, respectively. In addition, the plurality of host computers 0100 may be coupled to one storage node 0105. The storage node 0105 is a storage apparatus and is coupled through a network 0101 (communication line) to other storage nodes 0105. The host computer 0100 transmits a write command (write request) for writing data in the coupled storage node 0105 and a read command (read request) for reading data from the coupled storage node 0105 to the coupled storage node 0105. In addition, although the figure illustrates an example where the number of storage nodes 0105 is four, the number of storage nodes may be two, three, five or more. In addition, the storage system 0102 may be configured to include the plurality of management computers 0172.

The storage node 0105 is configured to include a storage medium unit 0160 including a data storage medium for storing data and a controller 0150 which controls the entire storage node 0105. In addition, the storage node 0105 may be configured to include the plurality of storage medium units 0160.

The storage medium unit 0160 includes a plurality of hard disk drives (HDDs) 0155 as an example of the data storage medium. Instead of the HDD 0155, a flash memory, or other storage devices may be used.

The controller 0150 is configured to include a central processing unit (CPU) 0135, a memory 0140, a data communication unit 0115, a front-end interface (FE I/F) 0110, a back-end interface (BE I/F) 0145, and a network interface card (NIC) 0171. In addition, each component of the controller 0150 may be plural.

The CPU 0135 controls components of the storage node 0105 according to programs and data in the memory 0140.

The data communication unit 0115 is configured to include a local router 0120, a buffer 0125, and a switch 0130. The local router 0120 controls data transfer between the FE I/F 0110 and the buffer 0125, data transfer between the buffer 0125 and the CPU 0135, and data transfer between the buffer 0125 and another CPU 0135 of a different storage node 0105. The switch 0130 is coupled to the network 0101 to control communication with the different storage node 0105. The network 0101 is, for example, peripheral component interconnect express (PCIe) or the like.

The FE I/F 0110 is an interface for coupling to the storage network and is, for example, a fibre channel (FC) I/F. In the embodiment, the FE I/F 0110 is directly coupled to the one host computer 0100. However, the FE I/F 0110 may be coupled to the plurality of host computers 0100 directly or through the storage network.

The BE I/F 0145 is an interface for coupling to the HDD 0155 and is, for example, a small computer system interface (SCSI) I/F.

The memory 0140 stores programs or control tables which the CPU 0135 uses to execute processes. The memory 0140 is configured to further include a cache memory 0250 which stores data read from the HDD 0155 or data to be written in the HDD 0155.

The NIC 0171 is coupled through a network 0170 for management to the management computer 0172. The network 0170 for management is, for example, a local area network (LAN).

The storage node 0105 manages a group of the plurality of HDDs 0155 in the storage medium unit 0160 logically as one storage volume. In the storage node 0105 according to the embodiment, high-speed data transfer according to the parallel access and high availability according to data redundancy are implemented using a redundant array of inexpensive disks (RAID) configuration. The group of the HDDs 0155 used in the RAID configuration is referred to as a RAID group. The present invention is not limited to the RAID configuration, but a just a bunch of disks (JBOD) configuration or a single-HDD configuration may be used.

All the storage nodes 0105 share a capacity pool (pool volume) configured by collecting storage areas of at least one RAID group. Although one or a plurality of capacity pools may be used, a case of one capacity pool is described herein. The storage node 0105 has one or a plurality of virtual volumes. The virtual volume is a virtualized volume as if it looks like a logical volume having a physical storage area although the volume has no physical storage capacity. The virtual volume can be allocated with a storage area of a pool volume configured by collecting storage areas of a logical volume in the storage node 0105.

The storage node 0105 manages the virtual volume in units of a virtual storage area having a predetermined size. When the storage node 0105 receives a write command of which write target is a virtual storage area in the virtual volume from the host computer 0100, in a case where a storage area of the RAID group is not allocated to the virtual storage area, the storage node 0105 selects a storage area from the RAID group included in the capacity pool to allocate the selected storage area to the virtual storage area. Although the normal volume is strapped to a RAID group or a single HDD, the virtual volume is not particularly limited as long as the virtual volume is strapped to a storage area included in a capacity pool. Therefore, in the embodiment, features of the virtual volume are used, and the storage node 0105 allocated with the disk area finally storing the data as well as the storage node 0105 allocated with the cache area caching the data is appropriately selected so that the number of times of data transfer between the storage nodes 0105 is reduced. In a storage system described as an embodiment, instead of using the virtual volume, by using a technique of virtualizing other volumes which do not have a physical storage capacity but have a function of allocating a storage area of a logical volume, the same effect as the embodiment can be obtained.

The management computer 0172 performs setting or state-checking on the controller 0150 or the storage medium unit 0160 of each storage node 0105, performs manipulations such as producing, changing, and removing of the capacity pool and virtual volume, and performs management of the network 0101.

Figure 2:
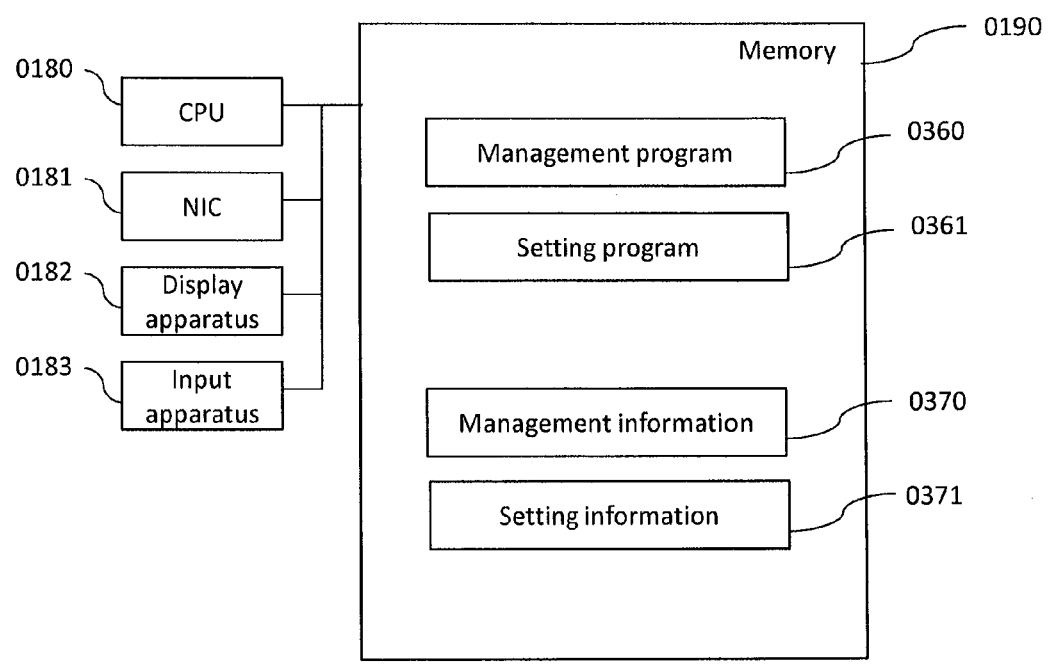
FIG. 2 illustrates a configuration of a management computer 0172.

FIG. 2 illustrates a configuration of the management computer 0172.

The management computer 0172 is configured to include a CPU 0180, an NIC 0181, a display apparatus 0192, an input unit 0193, and a memory 0190.

The CPU 0180 controls each component of the management computer 0172 according to programs and data of the memory 0190. The NIC 0181 is coupled through the network 0170 for management to the storage node 0105. The display apparatus 0192 performs displaying a screen according to an instruction of the CPU 0180. The input unit 0193 receives an input from a manager of the storage system 0102 and transmits the input information to the CPU 0180. The memory 0190 stores a management program 3060, a setting program 0361, management information 0370, and setting information 0371.

Hereinafter, information stored in the memory 0140 of the storage node 0105 will be described.

Figure 3:
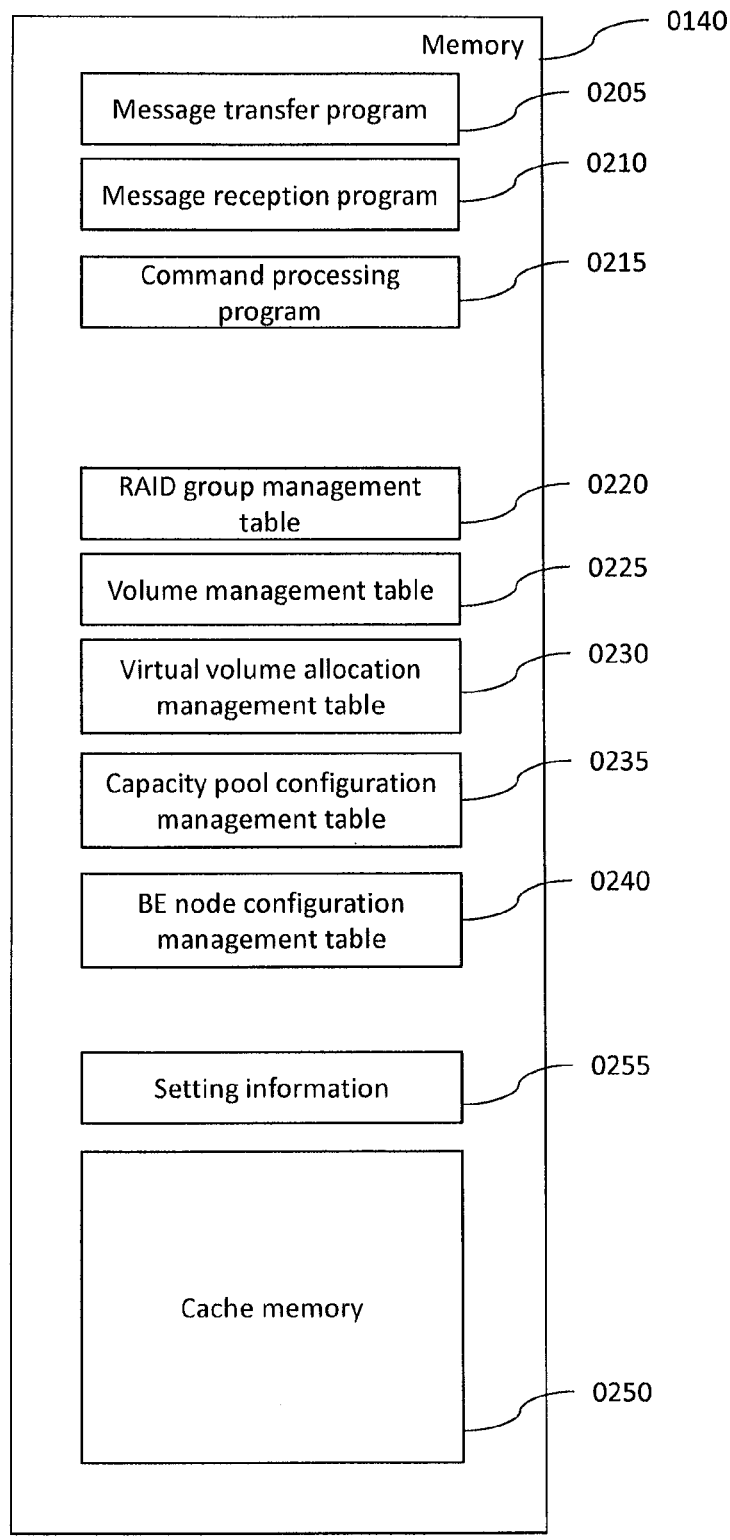
FIG. 3 illustrates information stored in a memory 0140 of a storage node 0105.

FIG. 3 illustrates information stored in the memory 0140 of the storage node 0105.

The memory 0140 stores, as programs, a message transfer program 0205, a message reception program 0210, and a command processing program 0215. In addition, the memory 0140 stores, as tables, a RAID group management table 0220, a volume management table 0225, a virtual volume allocation management table 0230, a capacity pool configuration management table 0235, a BE node configuration management table 0240, and setting information 0255. An area of the memory 0140 other than the area which stores the above-mentioned programs and tables is used as a cache memory 0250.

Figure 4:
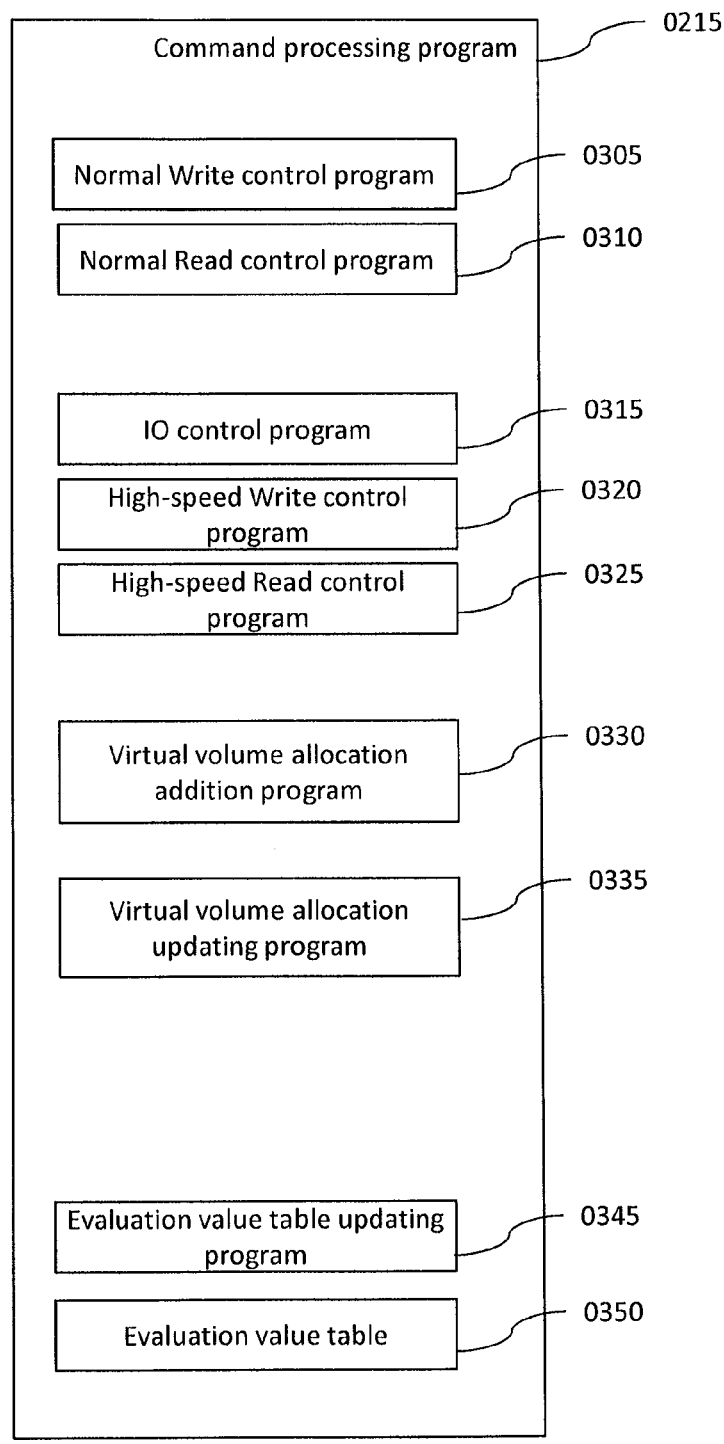
FIG. 4 illustrates a configuration of a command processing program 0215.

FIG. 4 illustrates a configuration of the command processing program 0215.

The command processing program 0215 is configured to include, as programs, a normal write control program 0305, a normal read control program 0310, an IO control program 0315, a high-speed write control program 0320, a high-speed read control program 0325, a virtual volume allocation addition program 0330, a virtual volume allocation updating program 0335, and an evaluation value table updating program 0345. In addition, the command processing program 0215 is configured to include an evaluation value table 0350. The evaluation value table 0350 includes a write evaluation value table and a read evaluation value table. The CPU 0135 controls the storage node 0105 according to each program in the command processing program 0215.

FIG. 5 illustrates a configuration of the RAID group management table 0220.

The RAID group management table 0220 stores information on the HDD 0155 constituting the RAID group. The RAID group management table 0220 has records of the RAID groups created in the storage node 0105. In addition, the RAID group management table 0220 includes, as members, a RAID group number 0405, a RAID level 0410, an HDD number list 0415, and an HDD size 0420. The RAID group number 0405 indicates the number of the RAID group. The RAID level 0410 indicates the RAID level of the RAID group. The HDD number list 0415 indicates the number of the HDD 0155 which is allocated to the RAID group. The HDD size 0420 indicates the size of the RAID group. The RAID group management table 0220 is created by the management computer 0172 and is stored in the storage node 0105.

Figure 6:
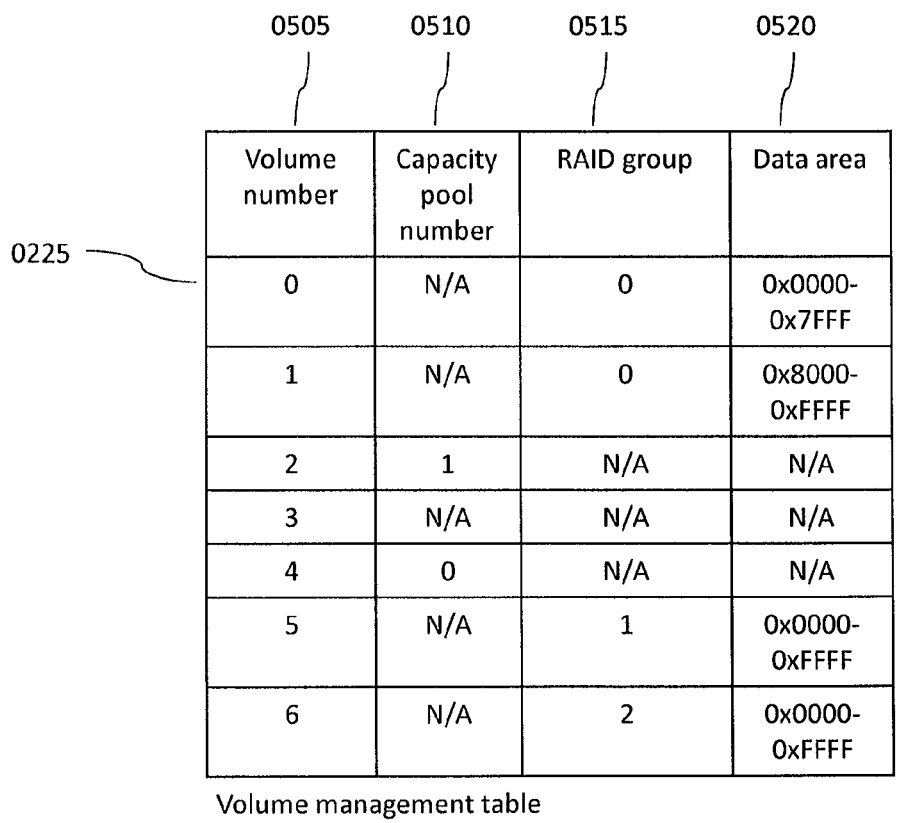
FIG. 6 illustrates a configuration of a volume management table 0225.

FIG. 6 illustrates a configuration of the volume management table 0225.

The volume management table 0225 stores information which is to be supplied to a storage user (host computer 0100). The volume management table 0225 has records of the volumes. In addition, the volume management table 0225 includes, as members, a volume number 0505, a capacity pool number 0510, a RAID group number 0515, and a data area 0520. The volume number 0505 indicates the number of the volume. In a case where the volume is a virtual volume, the capacity pool number 0510 indicates the number of the capacity pool associated with the virtual volume, and, for example, "N/A" indicating the volume is a virtual volume is stored in the RAID group number 0515 and the data area 0520. In a case where the volume is a logical volume, for example, "N/A" is stored in the capacity pool number 0510, and the number of the RAID group and the range of the data area of the RAID group associated with each other as the access destination of the data, respectively, are stored in the RAID group number 0515 and the data area 0520. In the embodiment, the case where the volume is a virtual volume will be described. The volume management table 0225 is created by the management computer 0172 and is stored in each of the storage nodes 0105.

FIG. 7 illustrates a configuration of the virtual volume allocation management table 0230.

The virtual volume allocation management table 0230 has records of the virtual storage areas in the virtual volume. The virtual storage area is managed, for example, in units of a page by a dynamic capacity allocating function. The page is a unit of management of a storage area formed by collecting a plurality of blocks which is a minimum unit of data read and write. In the below description, a storage area in the cache memory 0250 of the CM node allocated to the virtual storage area is referred to as a cache area, and a storage area in the RAID group of the BE node allocated to the virtual storage area is referred to as a drive area.

The virtual volume allocation management table 0230 stores the corresponding relation of the drive area allocated to the virtual storage area of the object. In addition, the virtual volume allocation management table 0230 includes, as members, a beginning address 0605, a RAID group number 0610, a storage destination BE node number 0615, an allocation destination address 0620, a storage destination CM node number 0625, and a reservation destination BE node number information 0630.

In the beginning address 0605, the virtual address of the beginning portion of the page existing in the virtual storage area on the virtual volume is stored. The RAID group number 0610 stores the number of the RAID group in which the drive area allocated to the virtual storage area is stored. In the storage destination BE node number 0615, the number indicating the storage destination BE node which is the storage node 0105 having the RAID group identified by the RAID group number 0610 is stored. In the allocation destination address 0620, the address of the drive area allocated to the virtual storage area identified by the beginning address 0605 in the storage destination BE node is stored. In addition, in a case where no drive area is allocated to the virtual storage area identified by the beginning address 0605, for example, "N/A" is stored in each of the RAID group number 0610, the storage destination BE node number 0615, and the allocation destination address 0620. The storage destination CM node number 0625 stores the number of the CM node which is the storage node 0105 in which the cache area allocated to the virtual storage area identified by the beginning address 0605 is stored. The reservation destination BE node number 0630 is an item which is used before the RAID group number 0610, the storage destination BE node number 0615, and the allocation destination address 0620 are determined. When the drive area is reserved, the reservation destination BE node number 0630 stores the number of the reservation destination BE node which is the storage node in which the drive area is stored. Each of the storage nodes 0105 updates the virtual volume allocation management table 0230 and transmits the updated content to a different storage node 0105 so that the updated content is reflected in the virtual volume allocation management table 0230 of the different storage node 0105. In addition, in the virtual volume allocation management table 0230, the address of the cache area allocated to the virtual storage area identified by the beginning address 0605 in the storage destination CM node may be stored.

FIG. 8 illustrates a configuration of the capacity pool configuration management table 0235.

The capacity pool configuration management table 0235 is a table for managing the free space of the capacity pool and non-allocated area of the RAID group. The capacity pool configuration management table 0235 includes records of the capacity pools and the records of the RAID groups. The records of the capacity pool include, as members, a capacity pool number 0705, existence of capacity pool production 0710, and a free space 0715. The capacity pool number 0705 indicates the number of the capacity pool. The existence of capacity pool production 0710 indicates whether or not the capacity pool is created. The free space 0715 indicates the free space of the capacity pool. The records of the RAID group include, as members, a RAID group number 0720, a capacity pool number 0725, and non-allocated area information 0730. The RAID group number 0720 indicates the number of the RAID group. The capacity pool number 0725 indicates the number of the capacity pool allocated to the RAID group. The non-allocated area information 0730 indicates a range of address of non-allocated area of the RAID group. Each of the storage nodes 0105 updates the capacity pool configuration management table 0235 and transmits the updated content to a different storage node 0105 so that the updated content is reflected in the capacity pool configuration management table 0235 of the different storage node 0105.

FIG. 9 illustrates a configuration of the BE node configuration management table 0240.

The BE node configuration management table 0240 is a table for managing the free space of the capacity pool by dividing the free space into the BE nodes, and is used to select the BE node of the drive area allocated to the virtual volume at the time of data writing. The BE node configuration management table 0240 has records of the capacity pools. In addition, the BE node configuration management table 0240 includes, as members, a capacity pool number 0805, a RAID group number 0810, an allocated area 0815, a reserved area 0820, a free space 0825, and a total area 0830. In the capacity pool number 0805, the number of the capacity pool is stored. In the RAID group number 0810, the number of the RAID group in the BE node among the RAID groups allocated to the capacity pool identified by the capacity pool number 0805 is stored. In the allocated area 0815, the capacity of the drive area allocated to the virtual volume among the storage areas of the RAID group identified by the RAID group number 0810 is stored. In the reserved area 0820, the capacity of the drive area of which allocation is reserved before allocated to the virtual volume among the storage areas of the RAID group identified by the RAID group number 0810 is stored. In the free space 0825, the capacity of the storage area which is neither allocated nor reserved to the virtual volume among the storage areas of the RAID group identified by the RAID group number 0810 is stored. In the total area 0830, the capacity of the entire storage areas of the RAID group identified by the RAID group number 0810 is stored. Each of the storage nodes 0105 updates the BE node configuration management table 0240 and transmits the updated content to a different storage node 0105 so that the updated content is reflected in the capacity pool configuration management table 0235 of the different storage node 0105.

The management computer 0172 creates the RAID group management table 0220 and the volume management table 0225 based on commands of the manager of the storage system 0102 and transmits the tables to the plurality of storage nodes 0105. The storage node 0105 updates the virtual volume allocation management table 0230, the capacity pool configuration management table 0235, and the BE node configuration management table 0240 and transmits the updated information to different storage nodes 0105. Therefore, the plurality of storage nodes 0105 synchronize the virtual volume allocation management table 0230 and the capacity pool configuration management table 0235. In addition, any one of the RAID group management table 0220, the volume management table 0225, the virtual volume allocation management table 0230, and the capacity pool configuration management table 0235 may be stored outside the storage node 0105, for example, in the management computer 0172 or the like.

Hereinafter, data transfer paths between the plurality of storage nodes 0105 will be described.

As one type of network topologies, there is a topology Any-to-any. In the topology Any-to-any, each storage node is directly coupled to all the other storage nodes. Since the Any-to-any connection is a symmetric topology, storage control can be easily deployed, so that many storage systems employ the Any-to-any connection. However, as the number of storage nodes is increased, the number of connections corresponding to the combinations of the storage nodes is increased. Therefore, there is a disadvantage in that the wiring of the network is difficult. Accordingly, there is a non-Any-to-any connection which is configured by reducing the number of connections from the Any-to-any connection.

Figure 10:
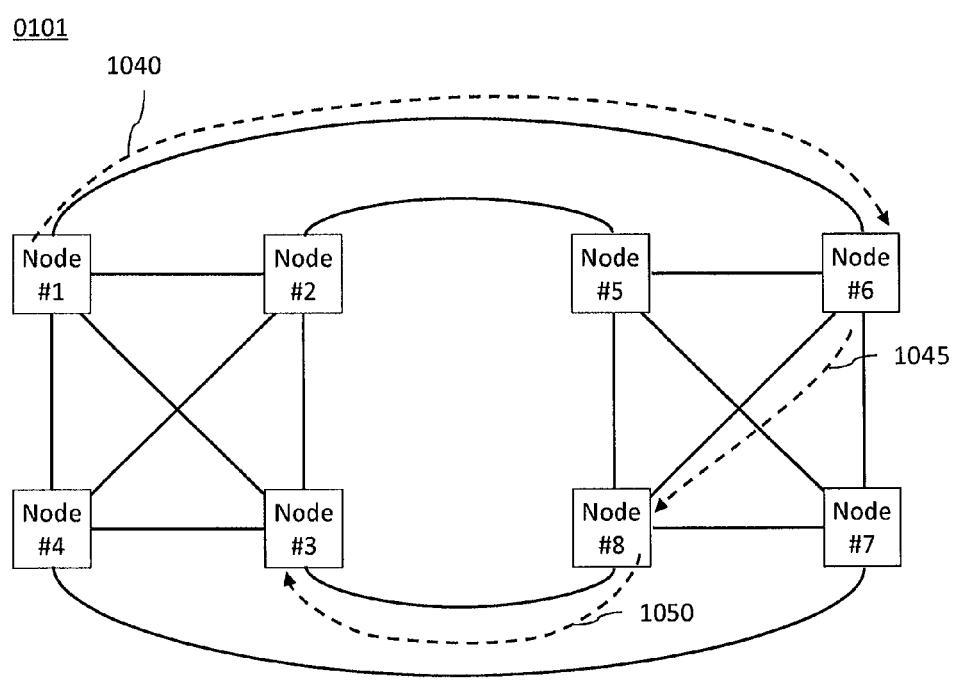
FIG. 10 illustrates data transfer in a first network of non-Any-to-any connection in a comparative example.

FIG. 10 illustrates a first network as an example of the non-Any-to-any connection.

The first network couples eight storage nodes indicated by nodes #1 to #8. Each node is coupled to the host computer. Each node is not directly coupled through the network to all the other nodes. Therefore, multi-stages of transfer (hop) are needed for communication between the nodes which are not directly coupled.

For example, in a case where the node #1 (1055) receives data write instruction from the host computer, the node #1 (1055) as a host node selects the node #8 of which a load of the cache memory 0250 is small as a CM node and separately selects the node #3 (1070) as an node where there is a free space in the RAID group in order to store data. In this case, three times of data transfer, that is, transfer (1040) from the node #1 (1055) to the node #6 (1060), transfer (1045) from the node #6 (1065) to the node #8 (1065), and transfer (1050) from the node #8 (1065) to the node #3 (1070) are performed. Therefore, in the embodiment, the host node (first storage apparatus) selects candidates of the CM node and candidates of BE node satisfying predetermined state conditions among the plurality of storage nodes 0105 and selects a combination of the CM node (second storage apparatus) and the BE node (third storage apparatus) of which number of transfer stages is small among the candidates of the CM node and the candidates of the BE node by considering the number of transfer stages (the number of connections, the number of times of data passing through the network 0101). Therefore, in the example illustrated in FIG. 10, in a case where there is a combination of nodes having CM and BE capacities, where a smaller number of transfer stages can be used, besides the node #8 and the node #3, the combination is preferentially selected. According to the present invention, in use of the limited network band, the steps of data transfer between the nodes are reduced, so that the data transfer amount can be reduced.

The network 0101 may have a different network topology of the first network, and any topology of a network which can drive the storage node 0105 in a cluster configuration may be used.

Figure 11:
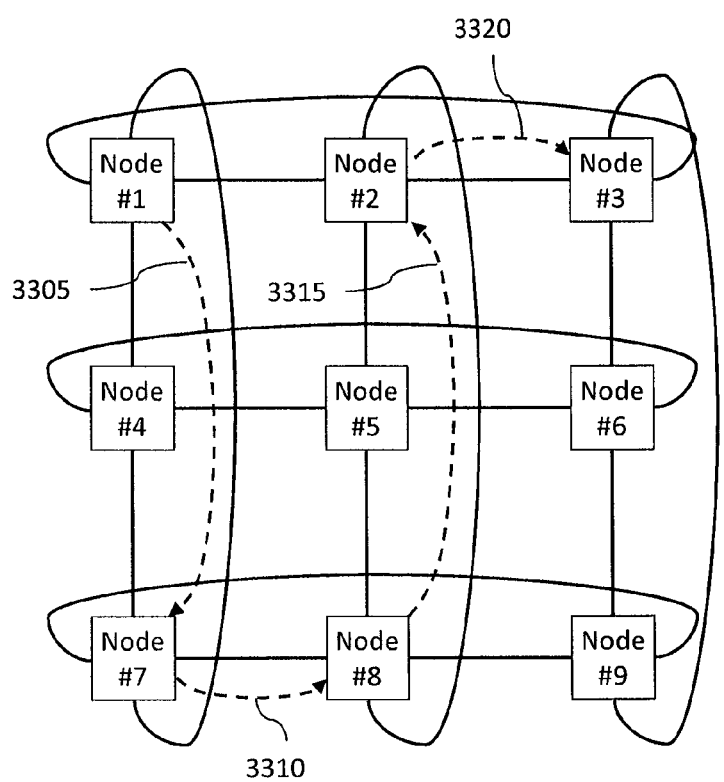
FIG. 11 illustrates data transfer in a second network of non-Any-to-any connection in a comparative example.

FIG. 11 illustrates a second network as another example of the non-Any-to-any connection. In the network, similarly to FIG. 10, node selection by considering the number of connection stages is needed.

Hereinafter, an evaluation value table used for selecting the CM node and the BE node will be described.

FIG. 12 illustrates a configuration of the write evaluation value table 1200.

The write evaluation value table 1200 is used by a host node receiving a write command to select the CM node and the BE node. This figure illustrates an example of the write evaluation value table 1200 stored in the node #1, and the table is used for a case where the node #1 receives the write command from the host computer 0100, that is, the case where the node #1 is a host node.

The write evaluation value table 1200 has rows of CM node numbers 1210 indicating the CM nodes and columns of BE node numbers 1205 indicating the BE nodes. The write evaluation value table 1200 includes cache load information 1215 indicating a result of determination of a cache load of each CM node and free space amount information 1220 indicating a result of determination of an amount of free space of each BE node. The cache load is a load of the cache memory 0250 of the corresponding CM node. The amount of free space is a size of the free space of the RAID group of the corresponding BE node. In this figure, the cache load information 1215 is indicated by "load" and the free space amount information 1220 is indicated by "free space". The cache load information 1215 indicates whether or not the cache load of the corresponding CM node is higher than the cache load threshold value, for example, whether the cache load has a value "high" or a value "low". For example, the cache load is indicated by the transfer amount of the cache memory 0250 of the corresponding CM node, and the cache load threshold value is indicated by the transfer amount threshold value. The free space amount information 1220 indicates whether or not the corresponding BE node has an amount of free space equal to or larger than a free space amount threshold value, for example, whether the corresponding BE node has a value "existence" or a value "non-existence". The storage node 0105 of which cache load information 1215 has a value "low" is selected as a candidate of the CM node. The storage node 0105 of which free space amount information 1220 has a value "existence" is selected as a candidate of the BE node. A process of producing the write evaluation value table 1200 or a process of updating the write evaluation value table 1200 will be described later. The above-described state condition is, for example, that the data transfer amount of the cache memory 0250 of the CM node is smaller than the transfer amount threshold value and the amount of free space of the BE node is larger than the free space amount threshold value.

In the items 1225 of the matrix of the write evaluation value table 1200, evaluation values of the combinations of the CM node numbers 1210 and the BE node numbers 1205 are stored. The evaluation value of a certain combination of the CM node number 1210 and the BE node number 1205 indicates a sum of the number of transfer stages from the host node to the CM node and the number of transfer stages from the CM node to the BE node. In the hereinafter description, the number of transfer stages is sometimes referred to as the number of hops. In each storage node 0105 which can become a host node, the write evaluation value table 1200 indicating the evaluation value of the case where the current storage node is a host node is stored.

By using the write evaluation value table 1200, the host node selects the storage node 0105 of which the cache load is determined to be low as a candidate of the CM node and selects the storage node 0105 where an amount of free space is determined to exist as a candidate of the BE node. In addition, the host node can select a combination of the CM node and BE node which has the smallest number of transfer stages among the candidates of the CM node and the candidates of the BE node.

Hereinafter, operations of the storage node 0105 which receives a data access request (IO command) from the host computer 0100 will be described.

Figure 13:
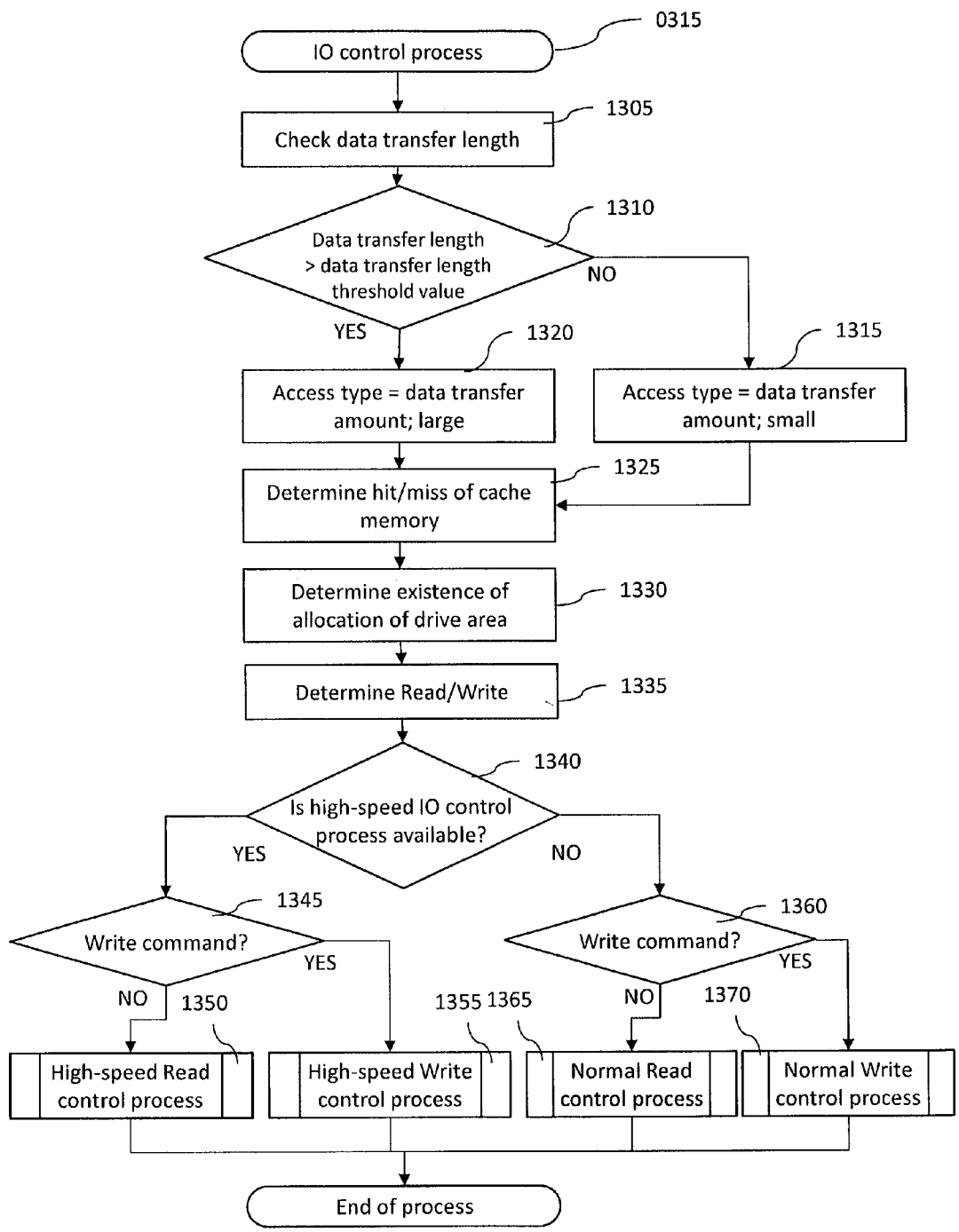
FIG. 13 illustrates operations of an IO control process.

FIG. 13 illustrates operations of the IO control process.

In the IO control process, the IO control program 0315 determines an optimal IO control based on an IO control determination condition including an access type, cache hit/cache miss, existence of allocation of the drive area, and a command type. First, the IO control program 0315 receives a data access request from the host computer 0100 and checks a data transfer length (data length) designated by the data access request (1305). The IO control program 0315 compares the data transfer length to a predefined data transfer length threshold value (data length threshold value) (1310). In a case where the data transfer length is larger than the data transfer length threshold value, the IO control program 0315 determines the access type as access of which data transfer amount is large (1320). In a case where the data transfer length is smaller than the data transfer length threshold value, the IO control program 0315 determines the access type as access of which data transfer amount is small (1315). Access having a large data transfer amount is, for example, sequential access, and access having a small data transfer amount is, for example, random access. Next, the IO control program 0315 determines whether the cache data corresponding to the virtual storage area designated by the virtual address and the data transfer length of the data access request exists in the cache memory 0250 (cache hit) or does not exist (cache miss) (whether or not the cache area corresponding to the designated virtual storage area is allocated in the cache memory 0250) (1325) and determines whether or not the drive area is allocated to the designated virtual storage area (1330). In addition, the IO control program 0315 determines whether the command type of data access request is a read command or a write command (1335).

The IO control program 0315 determines whether or not high-speed IO control is available, based on the determination results of the above-described access type, cache hit/cache miss, existence of allocation of the drive area, and command type (1340). In a case where it is determined that the high-speed IO control is available, the IO control program 0315 determines whether or not the determined command type is a write command (1345). When the command type is a write command, the IO control program 0315 performs a high-speed write control process (1355) and when the command type is a read command, the IO control program 0315 performs a high-speed read control process (1350). In a case where it is determine that the high-speed IO control is not available, the IO control program 0315 determines whether or not the determined command type is a write command (1360). When the command type is a write command, the IO control program 0315 performs a normal write control process (1365) and when the command type is a read command, the IO control program 0315 performs a normal read control process (1370). In addition, the high-speed IO control is also applied to the access having a small data transfer length, so that the steps of data transfer between the nodes are reduced similarly to the access having a large data transfer length, and thus, the data transfer is reduced. Therefore, performance of the entire system may be improved. Accordingly, the operations 1305, 1310, 1320, and 1315 are not mandatory. For example, in the case where access having a small data transfer length is not biased to some CM nodes, or in the case where small load is exerted on each CM node, small influence is applied to selection of candidate of the CM node in the access having a large data transfer length. In this case, since a combination of CM node and BE node having a small number of transfer stages can be selected from the candidates of the CM node and the BE node, the high-speed IO control of the present disclosure can be applied to all the access irrespective of the size of the data transfer length. Therefore, even in a case where a large amount of access having a small number of data transfer length occurs, the data transfer between the storage apparatuses can be reduced, so that the influence on the network band can be reduced.

The setting information 0255 includes information used for the IO control process, such as the data transfer length threshold value described above. The IO control program 0315 performs the IO control process based on the setting information 0255.

Hereinafter, the high-speed write control process will be described.

Figure 14:
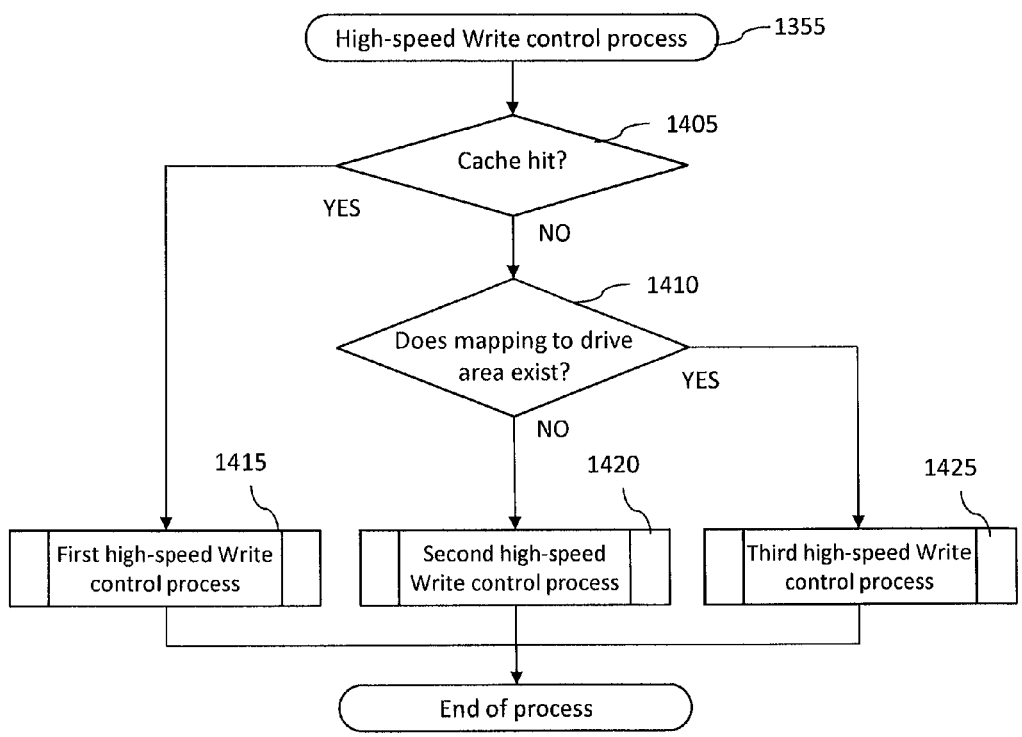
FIG. 14 illustrates a high-speed write control process.

FIG. 14 illustrates the high-speed write control process.

The high-speed write control program 0320 uses the result of determination of the cache hit/cache miss in the above-described process 1325 (1405). The cache hit indicates that the CM node is determined, and the cache miss indicates that the CM node is not determined. In a case where the determination result is "cache hit", the high-speed write control program 0320 performs a first high-speed write control process (1415). In a case where the determination result is not "cache hit", the high-speed write control program 0320 uses the results of determination of the existence of allocation of the drive area in the above-described process 1330 (1410). The existence indicates that the BE node is determined, and the non-existence indicates that the BE node is not determined. In a case where there is no mapping of the virtual storage area designated with a command to the drive area, the storage destination CM node number and the storage destination BE node number are not determined. Therefore, the high-speed write control program 0320 performs a second high-speed write control process (1420). In a case where there is mapping of the virtual storage area to the drive area, since the storage destination BE node number is already determined, the high-speed write control program 0320 performs a third high-speed write control process (1425). Hereinbefore, the high-speed write control processes are described.

FIG. 15 illustrates results of distributions of FIGS. 13 and 14. In addition, eventually, any distribution similar to the distributions disclosed in FIG. 15 may be sufficiently used, and the order of determinations disclosed in FIGS. 13 and 14 may be inverted.

For example, in a case where the access type 0905 is a "small data transfer amount", the IC control program 0315 determines that data beyond the network do not greatly occupy the network band, and similarly to the comparative example, the normal write control program 0305 selects the CM node and the BE node without consideration of consumption of the network band caused by the multi-stage transfer or the increase in the number of transfer stages. The normal write control program 0305 selects the CM node and the BE node, for example, through round robin. Therefore, without a bias to a specific node, the CM node and the BE node can be uniformly selected.

In addition, in a case where the access type 0905 is a "large data transfer amount", in a case where the CM node and the BE node are determined, the IO control program 0315 determines that the IO control is a normal IO control. In a case where both or one of the CM node and BE node is not determined, the IO control program 0315 determines that the high-speed IO control is available. However, in a case where the command type 0920 is a "read command", the drive area information 0915 is "not-exist", and the cache area information 0910 is "cache hit", the above state is a state before the data on the cache are written in the drive area of the reservation destination BE node, and the normal read control program 0310 performs a normal cache hit control. In addition, in a case where the command type 0920 is a "read command", the drive area information 0915 is "not-exist", and the cache area information 0910 is "miss", the above state is a specific state that data have never been written in the virtual storage area designated with the read command, and the normal read control program 0310 performs a normal control of the dynamic capacity allocating function, so that, for example, a predetermined response is transmitted to the host computer 0100.

The host node selects the IO control according to the IO control determination condition 0900, so that appropriate IO control can be performed in response to the data access request.

In addition, the IO control process may determine the IO control type by using a data access history indicating previous data access and by using data transfer length indicated by the data access history. For example, the IO control process records data transfer lengths of the read access and the write access for previous 10 minutes or less for each host computer 0100. In a case where there is a large amount of access where the data transfer length is longer than a data transfer length threshold value among the recorded access, it is determined that the access type of host computer 0100 is a "large data transfer amount". In a case where there is a large amount of access where the data transfer length is equal to or shorter than the data transfer length threshold value, it is determined that the access type is a "small data transfer amount".

In addition, the IO control process may determine the access type of each port and each virtual volume by using the data access history of each port and each virtual volume. In this manner, the data access history is used, so that the accuracy of determination of the access type can be improved. Herein, the port is a communication port of the storage system for performing data transfer with respect to the host computer.

In addition, the determination method indicating determination of the access type based on the data transfer lengths of the access or determination of the access type based on the data access history may be selected according to each host, each port, and each virtual volume.

Figure 16:
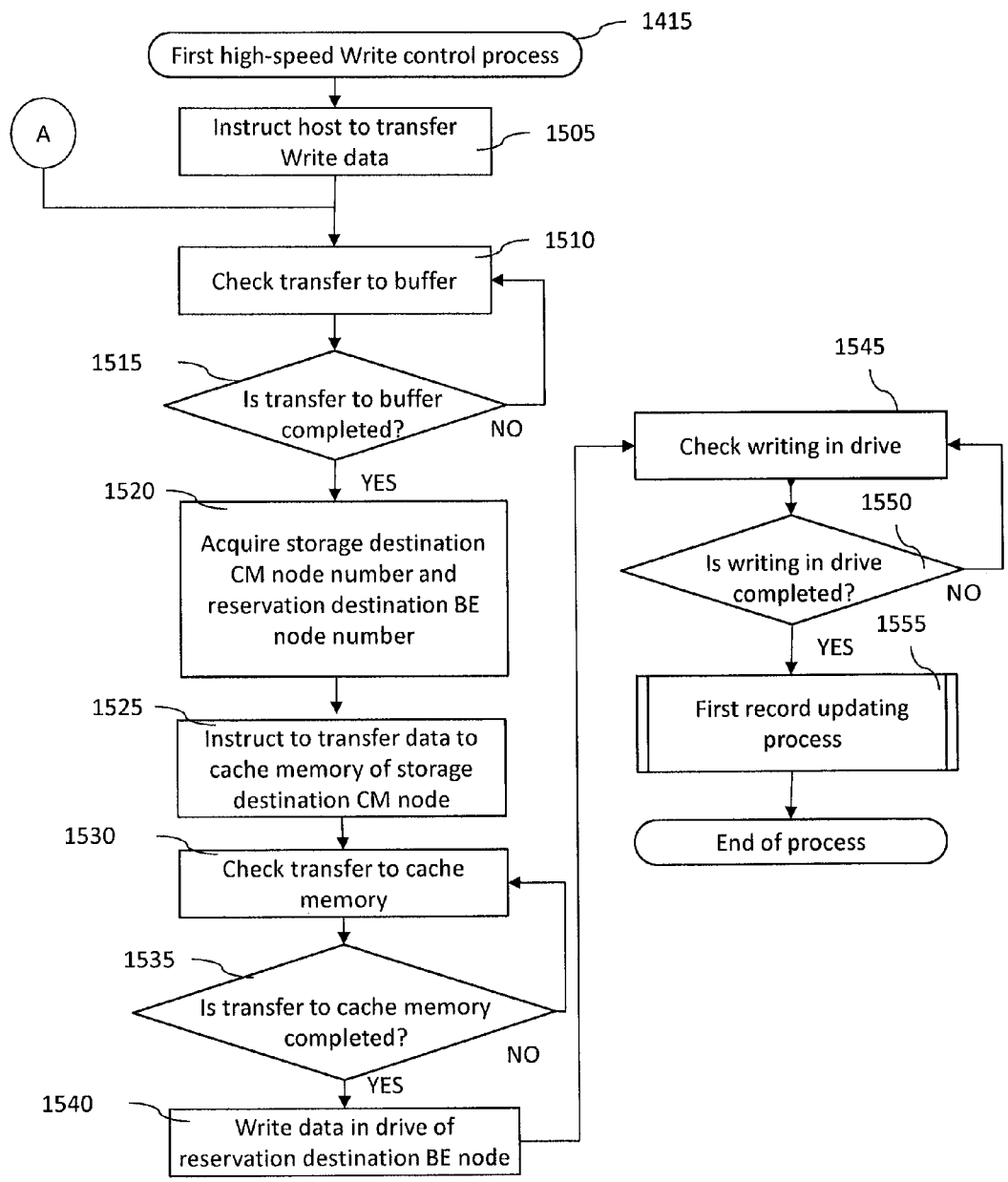
FIG. 16 illustrates a first high-speed write control process.

FIG. 16 illustrates the first high-speed write control process.

The first high-speed write control process is called in the IO control determination condition 0900 where the command is a "write command", the access type 0905 is a "large data transfer amount", the cache area information 0910 is "cache hit", and the drive area information 0915 is "not-exist". Namely, the above state is that the CM node and the BE node are already determined, and although the writing in the BE node is reserved, since data is not written in the BE node, the drive area is not allocated. Since the CM node and the BE node are already determined, the first high-speed write control process writes the data stored in the cache area of the CM node in the drive area of the reservation destination BE node. Namely, in a case of receiving a write command of updating the data which are written in the CM node and are to be written in the reservation destination BE node (data before the de-staging), the first high-speed write control process is performed.

First, the high-speed write control program 0320 instructs the host computer 0100 to transfer the write data (1505). Next, the high-speed write control program 0320 checks transfer to the buffer 0125 (1510) and determines whether or not transfer of the write data from the host computer 0100 to the buffer 0125 is completed (1515). If the transfer is completed, the high-speed write control program 0320 allows the flow to proceed to a process 1520. If the transfer is not completed, the high-speed write control program 0320 performs the checking in the process 1510 again.

Next, the high-speed write control program 0320 acquires a storage destination CM node number and a reservation destination BE node number corresponding to a virtual storage area designated by the write command from the virtual volume allocation management table 0230 (1520). The high-speed write control program 0320 instructs the local router 0120 to transfer data to the cache area of the node corresponding to the storage destination CM node number (1525). The high-speed write control program 0320 checks transfer to the cache area (1530) and determines whether or not the transfer to the cache area is completed (1535). If the transfer is completed, the high-speed write control program 0320 allows the flow to proceed to a process 1540. If the transfer is not completed, the high-speed write control program 0320 performs the checking in the process 1530 again.

Next, the high-speed write control program 0320 writes data in the drive of the reservation destination BE node (1540). Next, the high-speed write control program 0320 checks the writing to the drive (1545) and determines whether or not the writing to the drive is completed (1550). If the writing is completed, the high-speed write control program 0320 allows the flow to proceed to the process 1555. If the writing is not completed, the high-speed write control program 0320 checks the writing to the drive in the process 1545 again.

Next, the high-speed write control program 0320 performs a first record updating process of updating the record of the virtual volume allocation management table 0230 in response to the writing-completed state (1555). The first record updating process will be described later in detail. The control after the process 1540 is manipulation of de-staging the data on the cache memory 0250 to the drive of the BE node, and an existing cache management method may be used to determine the timing of de-staging. For example, the responding from the host node to the host computer 0100 may be performed after the writing in the CM node or after the writing in the BE node. Hereinbefore, the first high-speed write control process is described.

According to the process, with respect to the write command of updating the virtual storage area where allocation of the CM node is completed and reservation of the BE node is completed, the host node writes the write data in the allocation-completed CM node and writes the write data in the reservation-completed BE node, so that the write data can be transferred on the optimal path.

Figure 17:
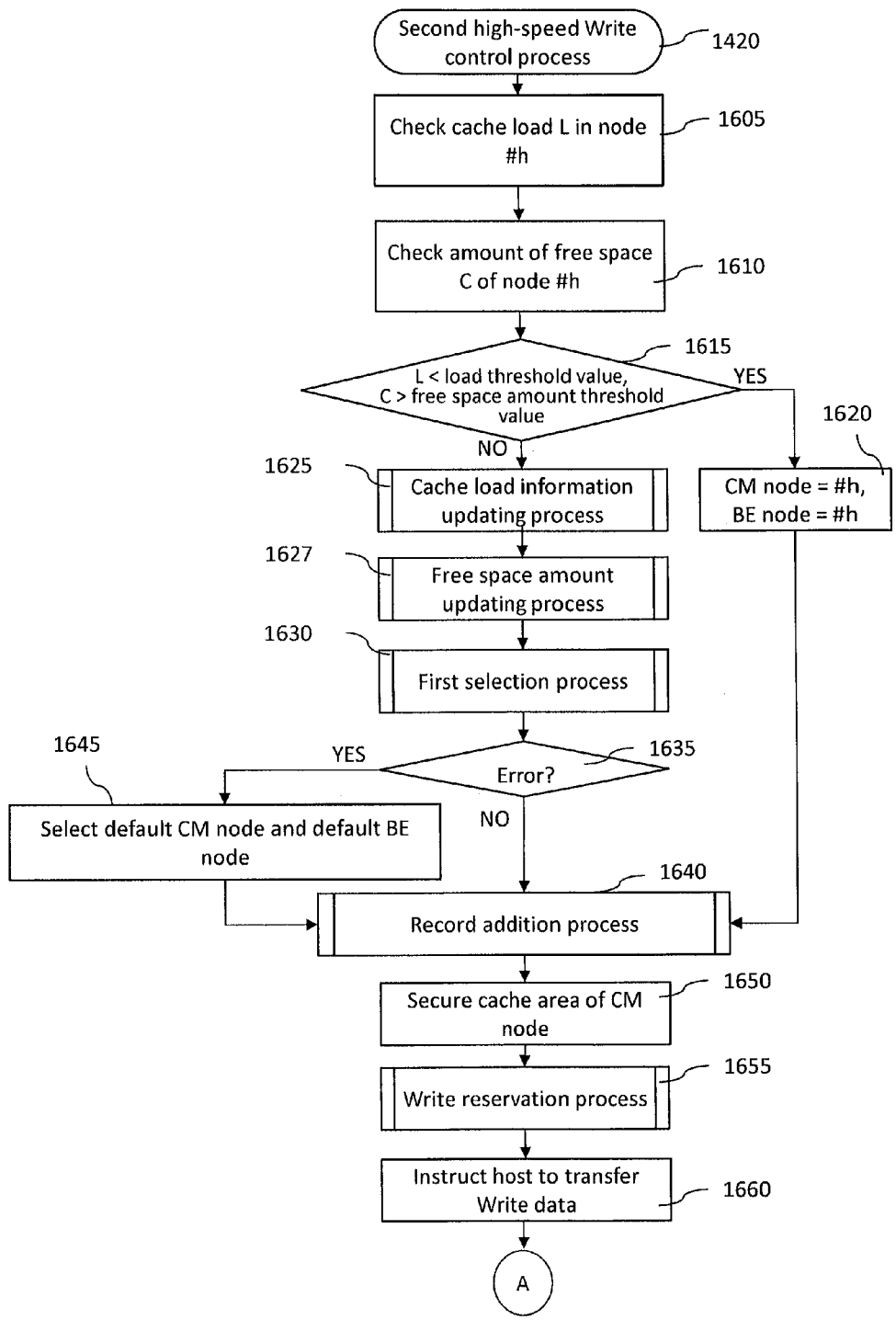
FIG. 17 illustrates a second high-speed write control process.

FIG. 17 illustrates the second high-speed write control process.

The second high-speed write control process is called in the IO control determination condition 0900 where the command is a "write command", the access type 0905 is a "large data transfer amount", the cache area information 0910 is "miss", and the drive area information 0915 is "not-exist". Namely, the above state is that the CM node is not determined, and writing in the BE node is not reserved. In other words, the above state is that a write command for the drive area is initially issued. Therefore, in the second high-speed write control process, the CM node and the BE node are determined, the write data from the host computer 0100 are stored in the cache area of the CM node, and the data is written in the drive area of the reservation destination BE node. Namely, in a case of receiving a write command of writing data in a new virtual storage area, the second high-speed write control process is performed.

Hereinafter, the node (host node) which receives a command from the host computer 0100 is denoted by node #h, and operations of the high-speed write control program 0320 of the node #h will be described. The high-speed write control program 0320 checks a cache load L in the node #h (1605). Next, the high-speed write control program 0320 checks an amount of free space C of the node #h (1610). The amount of free space C of the node #h is an amount of free space 0825 listed in the BE node configuration management table 0240 in the node #h. If the amount of free space of the node #h is equal to or larger than an free space amount threshold value, the drive area which is neither allocated nor reserved to the virtual volume among the storage areas of the RAID group in the node #h identified by the RAID group number 0810 can be allocated to the virtual storage area designated with a write command.

Next, the high-speed write control program 0320 determines whether or not the cache load L is smaller than a cache load threshold value and the amount of free space C is larger than the free space amount threshold value (1615). If the result of determination is YES, since the high-speed write control program 0320 can allocate a cache area and a drive area to the node #h, the high-speed write control program 0320 selects #h as a CM node and #h as a BE node (1620). In the process, if load on the CM of the host node is not high and there is a free space in the storage capacity, the host node itself, that is, the node of which the number of transfer stages from the host node is the smallest is preferentially selected. In this case, since the data transfer is closed within the node #h, the data transfer beyond the nodes does not occur. If the result of determination in the process 1615 is NO, the high-speed write control program 0320 performs a cache load information updating process of updating the load 1215 in the write evaluation value table 1200 with the latest value (1625) and performs a free space amount information updating process of updating the free space amount information 1220 in the write evaluation value table 1200 with the latest value (1627). The cache load information updating process and the free space amount information updating process will be described later in detail.

Next, the high-speed write control program 0320 performs a first selection process of selecting a combination having a low evaluation value, for example, a combination having the lowest evaluation value among combinations of the CM node having the low load and the BE node having an amount of free space of the BE node in the write evaluation value table 1200 (1630). Namely, the high-speed write control program 0320 selects a combination of the nodes of which the number of times of the data transfer beyond the nodes is the smallest. The first selection process will be described later in detail.

Next, the high-speed write control program 0320 determines whether or not an error occurs in the process 1630 (1635). The case where an error occurs denotes that a combination of the optimal CM and BE nodes is not found. Therefore, if the error occurs, the high-speed write control program 0320 selects predetermined default CM and BE nodes (1645). The default CM node and the default BE node are configured to, for example, the node #h (host node) receiving a command such that the data transfer is closed within the node. In addition, the default CM node and the default BE node may be different from each other. For example, a plurality of the cache memory 0250 may be mounted, and the node of which performance of a cache is the highest may be configured to a default CM node. In addition, for example, a node of which area of the capacity pool is the largest, that is, a node of which value of the total area 0830 in the BE node configuration management table 0240 is the largest may be configured a default BE node.

If no error occurs, the high-speed write control program 0320 performs a record addition process of adding a new record of the virtual storage area designated by the command in the virtual volume allocation management table 0230 (1640). The record addition process will be described later in detail. Next, the high-speed write control program 0320 secures a cache area in the cache memory 0250 of the selected CM node (1650) and performs a write reservation process of reserving a disk area for writing data in the selected BE node (1655). The write reservation process will be described later in detail. After the write reservation process is completed, the high-speed write control program 0320 instructs the host computer 0100 to transfer write data (1660).

Next, the high-speed write control program 0320 stores the write data transferred from the host computer 0100 in the cache area of the CM node. The following flow is the same as the flow following "A" in the above-described first high-speed write control process. Hereinbefore, the second high-speed write control process is described.

According to the process, the CM node having low load and the BE node having an amount of free space can be allocated to a new virtual storage area while considering the number of transfer stages. Therefore, with respect to the write data, the number of transfer stages from the host node through the CM node to the BE node can be reduced. In addition, after the host node can secure the cache area of the CM node and reserve the drive area of the BE node, the host node can instruct the host computer 0100 to transfer the write data, and thus, a high-speed response to the host computer 0100 can be implemented while determining a combination of the optimal CM and BE nodes. In addition, in a case where the cache load and the amount of free space of the local node satisfies a predetermined condition, the host node preferentially selects the local node as the CM node and the BE node, so that the data transfer through the network 0101 can be prevented.

Figure 18:
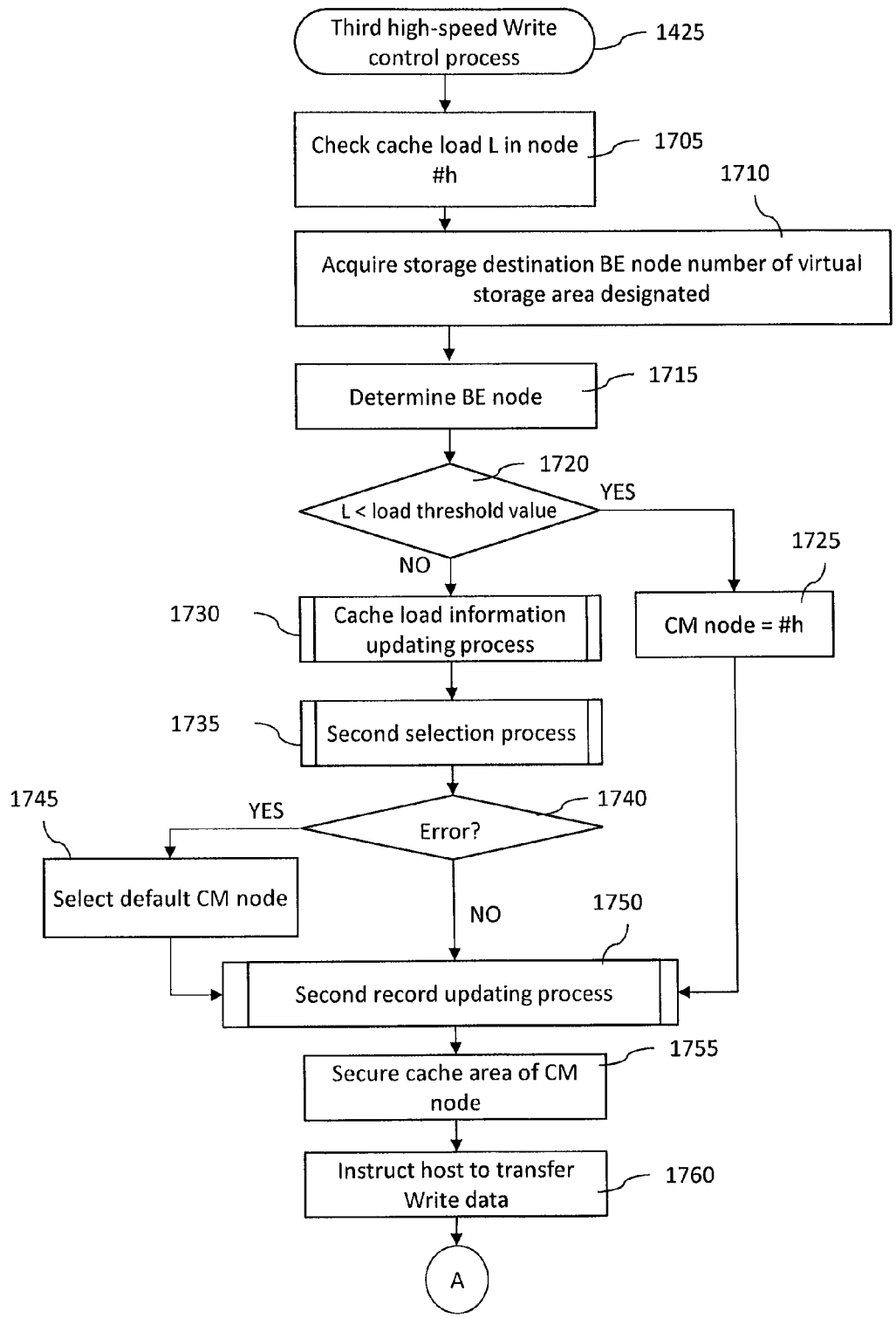
FIG. 18 illustrates a third high-speed write control process.

FIG. 18 illustrates the third high-speed write control process.

The third high-speed write control process is called in the IO control determination condition 0900 where the command is a "write command", the access type 0905 is a "large data transfer amount", the cache area information 0910 is "miss", and the drive area information 0915 is "exist". Namely, the above state is that the CM node is not determined but the BE node is determined, and allocation and writing of the drive area are completed. The state where the CM node is not determined is because the data on the cache area are released after the data are written in the BE node. Therefore, the third high-speed write control process performs a process of determining the CM node, storing the write data of the host in the cache of the determined CM node, and writing the data in the drive area of the BE node. Namely, in a case where the data after the writing in the CM node and the writing in the BE node (de-staging) are removed from the CM node and a write command of updating the data is received, the third high-speed write control process is performed.

First, the high-speed write control program 0320 checks the cache load L of the node #h which receives the command (1705). Next, the high-speed write control program 0320 acquires the storage destination BE node number of the record of the virtual storage area designated by the write command in the virtual volume allocation management table 0230 (1710). Next, the high-speed write control program 0320 selects the storage destination BE node number acquired as the BE node (1715). Next, the high-speed write control program 0320 determines whether or not the cache load L is smaller than the cache load threshold value (1720).

If the cache load L is determined to be smaller than the cache load threshold value, the high-speed write control program 0320 selects the node #h as the CM node (1725). Namely, the high-speed write control program 0320 selects the cache memory 0250 of the host node as the cache memory 0250 of the storage destination CM node. If the cache load L is determined to be larger than the cache load threshold value in the process 1720, the high-speed write control program 0320 performs a cache load information updating process of updating the cache load information 1215 of the write evaluation value table 1200 with the latest value (1730).

Next, the high-speed write control program 0320 performs a second selection process of selecting the optimal CM node based on the write evaluation value table 1200 (1735) and determines whether or not error occurs in the process 1735 (1740). The second selection process will be described later in detail. The case where an error occurs denotes that an optimal CM node is not found. Therefore, in the case where an error occurs, the high-speed write control program 0320 selects a predetermined default CM node (1745). The default CM node is configured to, for example, the node #h (host node) receiving a command such that the data transfer is closed within the node. Otherwise, for example, a plurality of the cache memory 0250 may be mounted, and the node of which performance of a cache is the highest may be configured to a default CM node.

In a case where no error occurs, the high-speed write control program 0320 performs a second record updating process of updating records of the virtual storage area designated with a command in the virtual volume allocation management table 0230 (1750). The second record updating process will be described later in detail. Next, the high-speed write control program 0320 secures a cache area in the CM node (1755) and instructs the host computer 0100 to transfer the write data (1760).

Next, the high-speed write control program 0320 stores the write data transferred from the host computer 0100 in the cache area of the CM node. The following flow is the same as the flow following "A" in the above-described first high-speed write control process. Hereinbefore, the third high-speed write control process is described.

According to the process, with respect to a write command for updating the virtual storage area where releasing of allocation of the CM node is completed and allocation of the BE node is completed, the host node allocates the optimal CM node to the virtual storage area and writes the write data in the allocation-completed BE node, so that the write data can be transferred in the optimal path.

Figure 19:
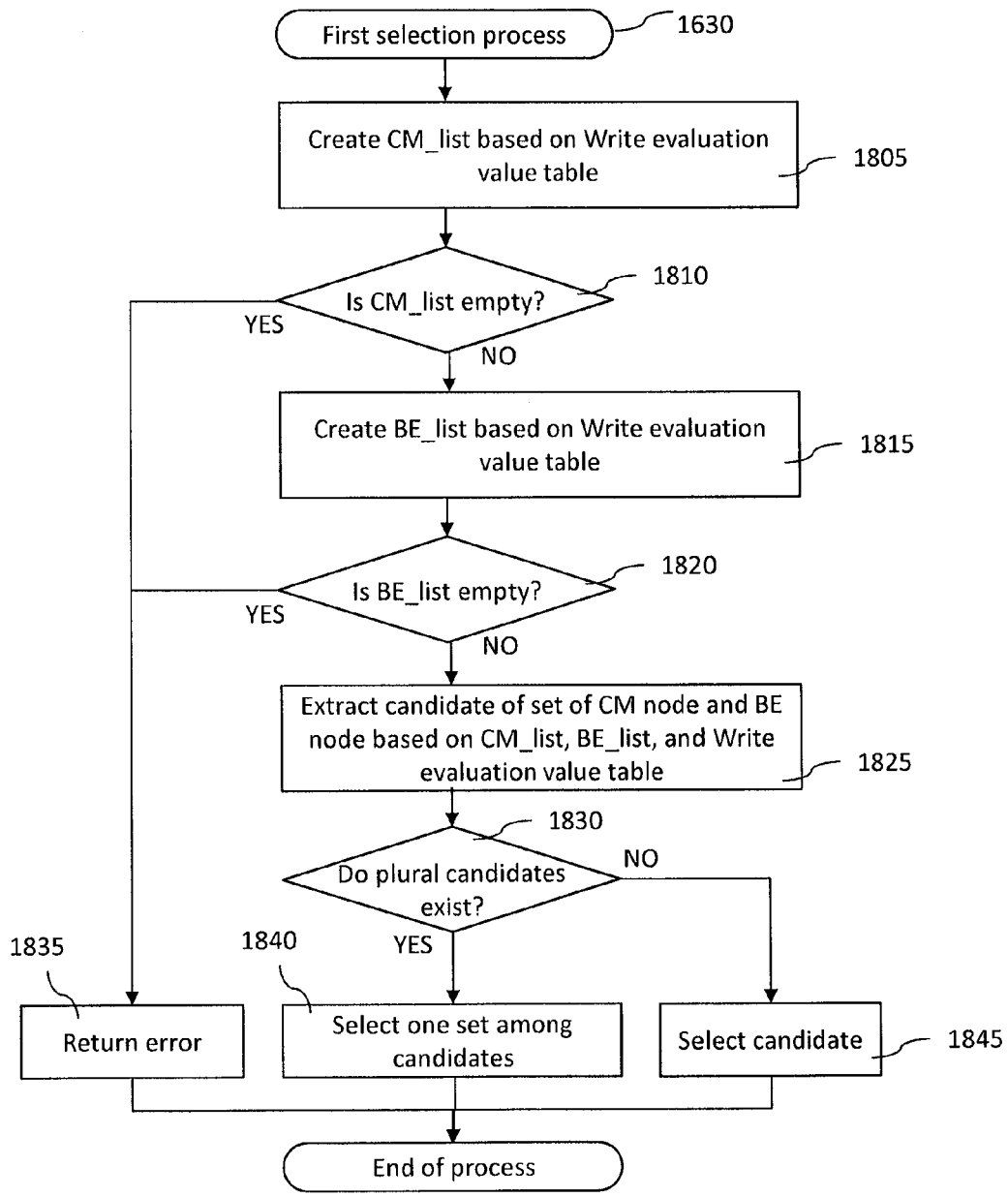
FIG. 19 illustrates a first selection process 1630.

FIG. 19 illustrates the first selection process 1630.

Herein, the above-described first selection process 1630 will be described in detail. First, the high-speed write control program 0320 extracts the node of which cache load is determined to be low from the write evaluation value table 1200 and creates a CM node list indicating the extracted node (1805). Hereinafter, the CM node list is referred to as a CM_list. Next, the high-speed write control program 0320 determines whether or not the CM_list is empty (1810). In a case where the CM_list is empty, the high-speed write control program 0320 returns an error to the second high-speed write control process (1835), and the flow is ended. In the case where the CM_list is not empty, the high-speed write control program 0320 extracts the node where an amount of free space is determined to exist from the write evaluation value table 1200 and creates a BE node list indicating the extracted node (1815). The BE node list is referred to as a BE_list. Next, the high-speed write control program 0320 determines whether or not the BE_list is empty (1820). If the BE_list is empty, the high-speed write control program 0320 returns the error to the second high-speed write control process (1835) and ends the flow. If the BE_list is not empty, the high-speed write control program 0320 extracts a combination of nodes from combinations of the CM nodes included in the CM_list and the BE nodes included in the BE_list by considering the corresponding item 1225 in the write evaluation value table 1200 (1825). For example, by selecting a combination where the item 1225 is minimum, a combination where the data transfer path is short is selected. Or, for example, in a case where a large data transfer amount flows the data transfer path corresponding to the combination where the item 1225 is minimum and load on the data transfer path is high, or in a case where failure occurs in the network on the data transfer path so that the data transfer cannot be performed, a combination where the item 1225 is secondly minimum or a combination where the item 1225 is equal to or less than a predetermined threshold value may be extracted as a candidate. Next, the high-speed write control program 0320 determines whether or not a plurality of the candidates exists (1830), and in a case where a plurality of the candidates exists, the high-speed write control program 0320 selects one combination at random from the plurality of the candidates (1840), and the flow is ended. In a case where only one candidate exists, the high-speed write control program 0320 selects the candidate (1845), and the flow is ended. Hereinbefore, the first selection process 1630 is described.

Figure 20:
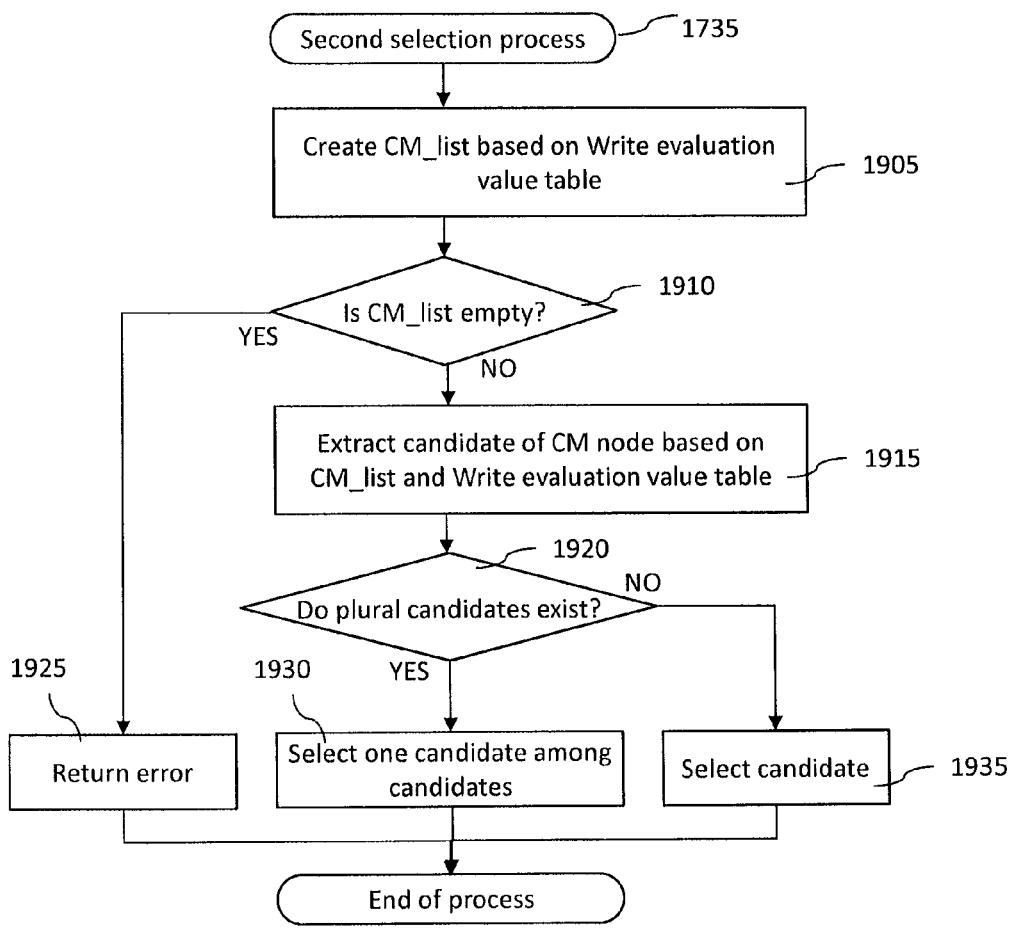
FIG. 20 illustrates a second selection process 1735.

FIG. 20 illustrates the second selection process 1735.

Herein, the above-described second selection process 1735 will be described in detail. In comparison to the first selection process 1630, in the second selection process 1735, the BE node has already been determined, and only the CM node is selected.

First, the high-speed write control program 0320 performs the same process (1905) as the 1805 of the first selection process 1630 and the same process (1910) as the 1810. In a case where the CM_list is empty, the high-speed write control program 0320 performs the same process (1925) as the 1825, and the flow is ended. In a case where the CM_list is not empty, with respect to the determination-completed BE node, the high-speed write control program 0320 extracts the CM node among the CM nodes included in the CM_list by considering the corresponding item 1225 in the write evaluation value table 1200 (1915). The extraction method is the same as the 1825. Next, the high-speed write control program 0320 performs the same process (1920) as the 1830, the same process (1930) as the 1840, and the same process (1935) as the 1945, and the flow is ended. Hereinbefore, the second selection process 1735 is described.

Figure 21:
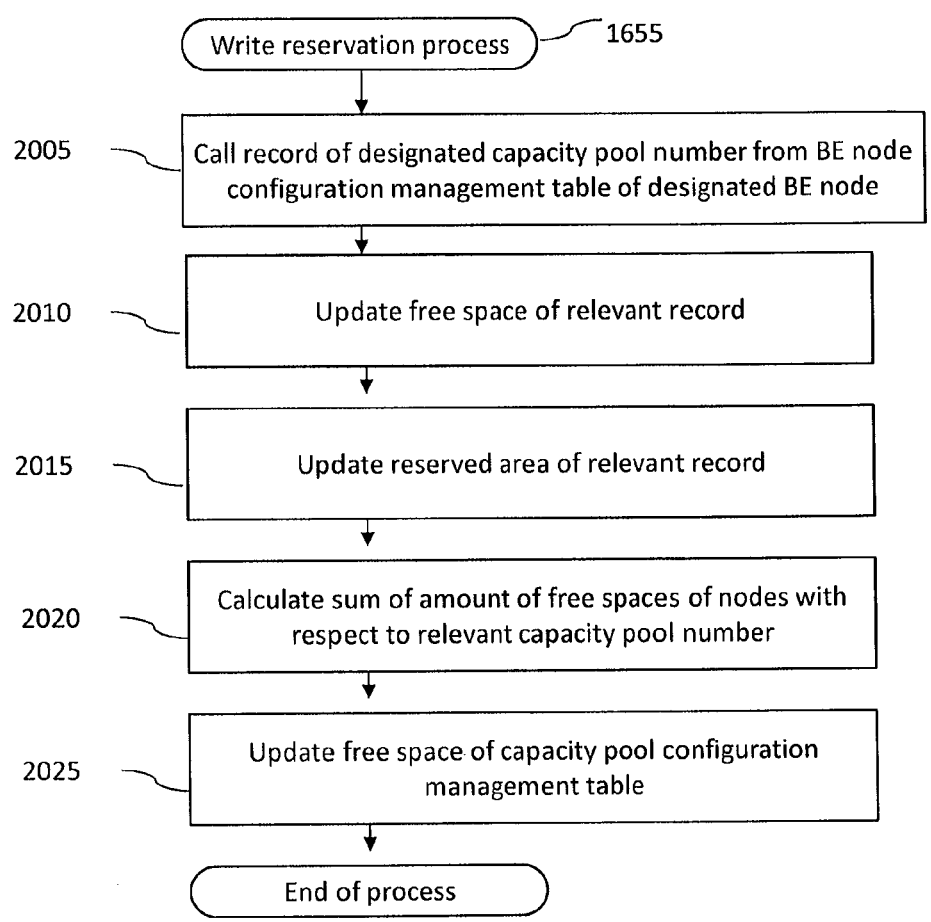
FIG. 21 illustrates a write reservation process 1655.

FIG. 21 illustrates the write reservation process 1655.

Herein, the above-described write reservation process 1655 will be described in detail. First, the high-speed write control program 0320 calls the record of the designated capacity pool number from the BE node configuration management table 0240 of the designated BE node (2005). Next, the high-speed write control program 0320 subtracts a reserved size from the size of the free space of the record and updates the record (2010). Next, the high-speed write control program 0320 adds the reserved size to the reserved area of the record and updates the record (2015). Next, the high-speed write control program 0320 calculates a sum of the sizes of the free spaces of the capacity pool numbers in the BE node configuration management table 0240 of each node (2020) and updates the size of the free space of the capacity pool number of the capacity pool configuration management table 0235 with the calculated value (2025), and the flow is ended. Hereinbefore, the write reservation process is described.

In addition, the host node may change reservation of the BE node. The reservation changing has an advantage in that appropriate BE node can be selected again, in a case where the method of determining the access type is changed and the result of determination of the IO control type is updated. In the reservation changing, the high-speed write control program 0320 returns the information of the time when the disk area is reserved for the BE node in the write reservation process to the origin and selects the more appropriate BE node again to reserve the disk area for the BE node in the write reservation process. The timing of the reservation changing is the time interval until data are actually written in the reserved drive area in the reservation destination BE node by the de-staging of the cache, namely, the time interval before the storage destination BE node is definitely determined. However, since the data which are to be written in the reserved drive area are stored in the cache memory, in some cases, because the de-staging of the cache is delayed, the amount of free space of the cache memory may be insufficient. Therefore, in a case where the amount of free space of the cache memory is insufficient, the reservation is not allowed to be changed so that there is no influence on the de-staging of the cache.

In addition, the condition of the reservation changing may be predetermined. For example, if the number of times of read and write performed by the host computer 0100 after the reservation is a predetermined number of times or less, it is determined that there is a spare time until the de-staging, and the reservation changing is available. In a case where the frequency of the reservation changing is high, there may be a problem in that other processes in the storage system 0102 are delayed. Therefore, in the case where the determination of the access type is frequently changed, it may be determined that the reservation changing is not performed. For example, in a case where sufficient history of the data access is not collected, since the possibility of the change in the determination of the access type is high, if the number of times of access is a predetermined number of times or less, the high-speed write control program 0320 cancels the reservation changing.

Figure 22:
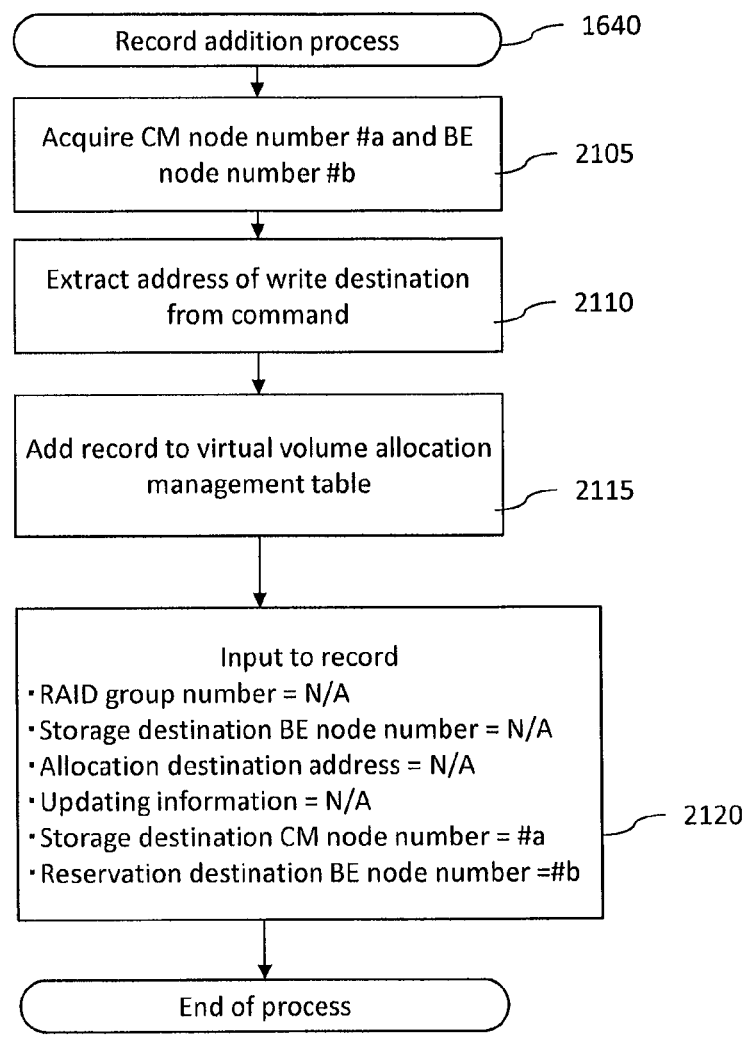
FIG. 22 illustrates a record addition process 1640.

FIG. 22 illustrates the record addition process 1640.

Herein, the above-described record addition process 1640 will be described in detail. First, the virtual volume allocation addition program 0330 acquires the selected CM node number #a and the selected BE node number #b (2105) and extracts a virtual address of a write object from the write command (2110). Next, the virtual volume allocation addition program 0330 adds a new record corresponding to the extracted virtual address to the virtual volume allocation management table 0230 (2115). Next, the virtual volume allocation addition program 0330 inputs, in the added record, N/A to the RAID group number; N/A to the storage destination BE node number; N/A to the allocation destination address; N/A to the updating information; #a to the storage destination CM node number; and #b to the reservation destination BE node number (2120), and the flow is ended. Hereinbefore, the record addition process 1640 is described.

Figure 23:
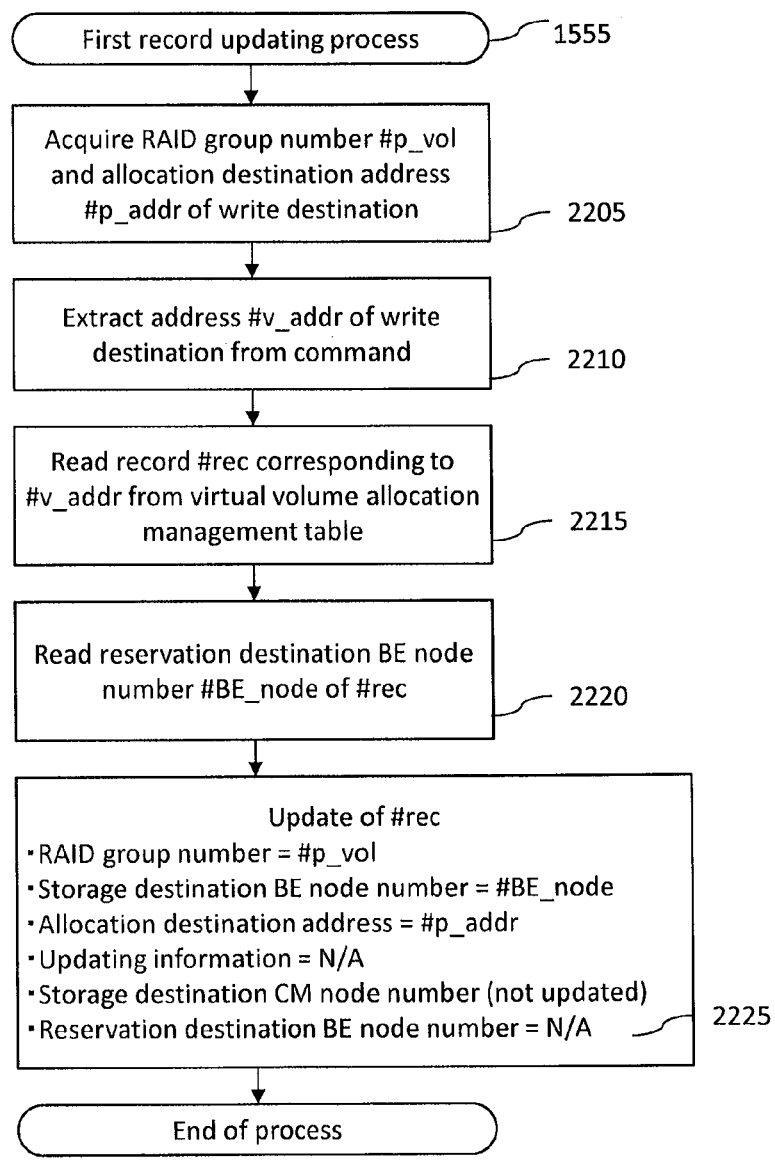
FIG. 23 illustrates a first record updating process 1555.

FIG. 23 illustrates the first record updating process 1555.

Herein, the above-described first record updating process 1555 will be described in detail. First, the virtual volume allocation updating program 0335 acquires the RAID group number #p_vol and allocation destination address #p_addr of the write destination (2205). Next, the virtual volume allocation updating program 0335 extracts the virtual address #v_addr of the write destination from the write command (2210). Next, the virtual volume allocation updating program 0335 reads the record #rec corresponding to the virtual address #v_addr from the virtual volume allocation management table 0230 (2215). Next, the virtual volume allocation updating program 0335 reads the reservation destination BE node number #BE_node of the record #rec (2220).

Next, the virtual volume allocation updating program 0335 inputs #p_vol, #BE_node, #p_addr, N/A, and N/A to the RAID group number, the storage destination BE node number, the allocation destination address, the updating information, and the reservation destination BE node number of the #rec, respectively, and does not update the storage destination CM node number (2225), and the flow is ended. Hereinbefore, the first record updating process 1555 is described.

Figure 24:
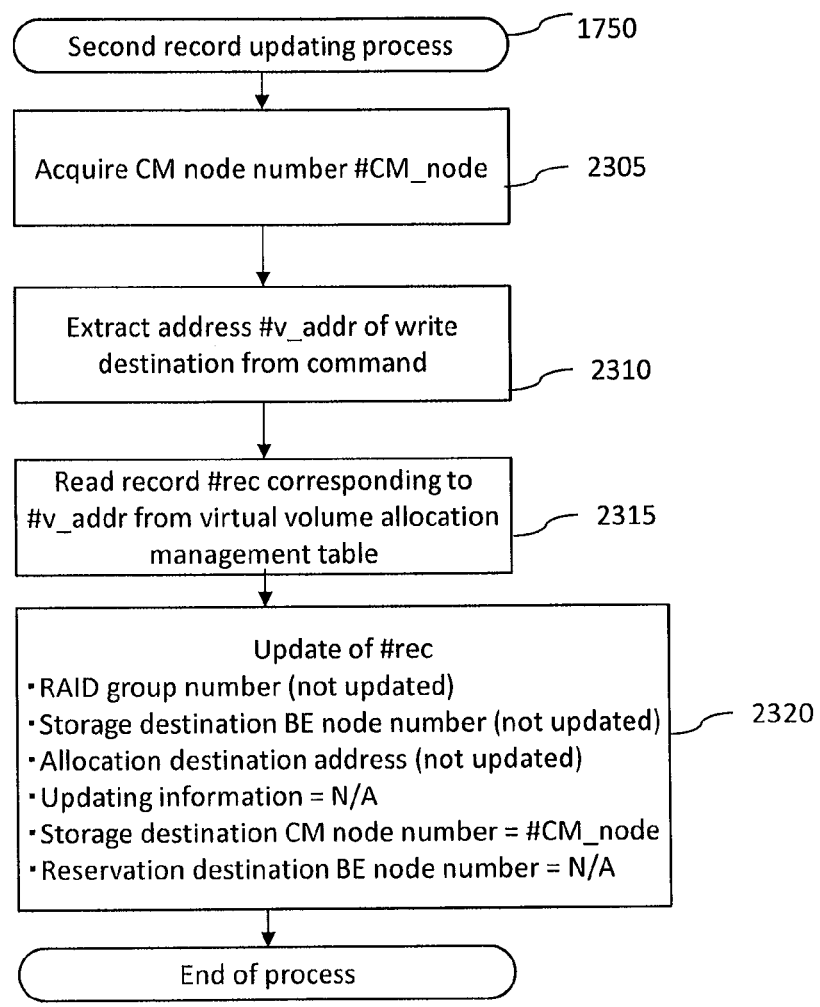
FIG. 24 illustrates a second record updating process 1750.

FIG. 24 illustrates the second record updating process 1750.

Herein, the above-described second record updating process 1750 will be described in detail. First, the virtual volume allocation updating program 0335 acquires the selected CM node number #CM_node (2305). Next, the virtual volume allocation updating program 0335 extracts the virtual address #v_addr of the write destination from the write command (2310). Next, the virtual volume allocation updating program 0335 reads the record #rec corresponding to the address #v_addr from the virtual volume allocation management table 0230 (2315). Next, the virtual volume allocation updating program 0335 inputs N/A, #CM_node, and N/A to the updating information, the storage destination CM node number, and the reservation destination BE node number in the #rec, respectively, and does not update the RAID group number, the storage destination BE node number, and the allocation destination address (2320), and the flow is ended. Hereinbefore, the second record updating process 1750 is described.

Figure 25:
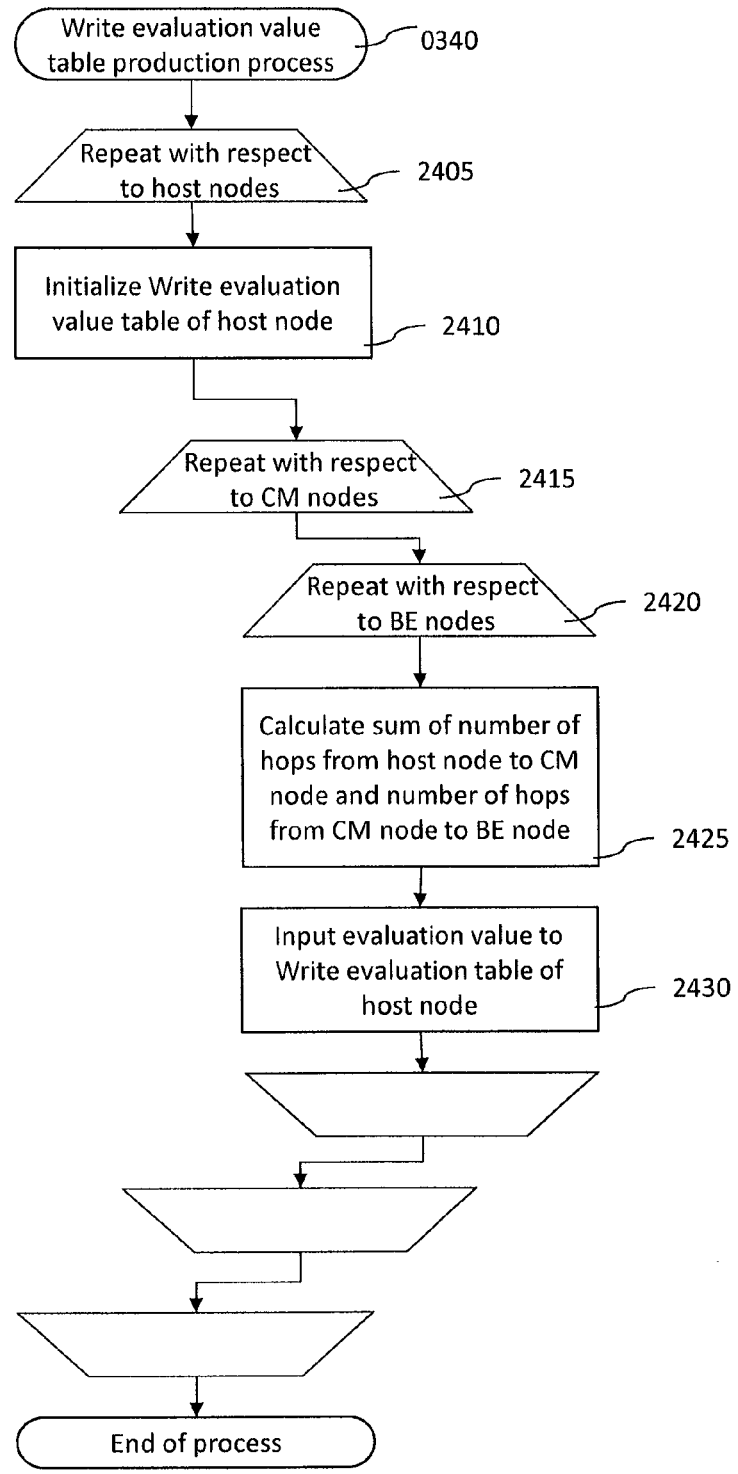
FIG. 25 illustrates a write evaluation value table production process.

FIG. 25 illustrates the write evaluation value table production process.

In the embodiment, the evaluation value stored in the item 1225 of the write evaluation value table 1200 is a sum of the number of hops from the host node to the CM node and the number of hops from the CM node to the BE node. The management computer 0172 manages the network 0101 and the switch 0130 of the storage node 0105. The management program 0360 of the management computer 0172 can perform manipulation of adding, removing, and changing the management information 0370 indicating the settings of the network 0101 and the settings of the storage node 0105 according to instruction from a manager of the storage system 0102. The management information 0370 includes topology information indicating a topology of the network 0101. The management program 0360 calculates the evaluation value using the topology information. When the network 0101 is newly constructed and when the topology of the network 0101 is changed, the management computer 0172 may perform the write evaluation value table production process.

In the write evaluation value table production process, the management computer 0172 sequentially selects the nodes as the host nodes #host_node (2405). If the host node #host_node is selected, the management computer 0172 initializes the write evaluation value table 1200 which is #eval_table stored in the host node #host_node (2410). Next, the management computer 0172 sequentially selects the nodes as the CM node #CM_node (2415). If the CM node #CM_node is selected, the management computer 0172 sequentially selects the nodes as the BE node #BE_node (2420). If the BE node #BE_node is selected, the management computer 0172 calculates a sum of the number of hops from the #host_node to the #CM_node and the number of hops from the #CM_node to the #BE_node as an evaluation value #hop_sum (2425) and inputs the #hop_sum to the item 1225 in the #eval_table corresponding to the setting (#CM_node, #BE_node) (2430). The management computer 0172 repeats the loop of the process 2420 with respect to all the #BE_node. In addition, the management computer 0172 repeats the loop of the process 2415 with respect to all the #CM_node. In addition, the management computer 0172 repeats the loop of the process 2405 with respect to all the #host_node. Hereinbefore, the write evaluation value table production process is described.

Herein, the above-described cache load information updating processes 1625 and 1730 will be described in detail.

Each of the cache load information updating processes 1625 and 1730 includes a process determining the cache load information of the local node and notifying other nodes of the cache load information and a process receiving the cache load information from other nodes and updating the evaluation value table of the local node.

Figure 26:
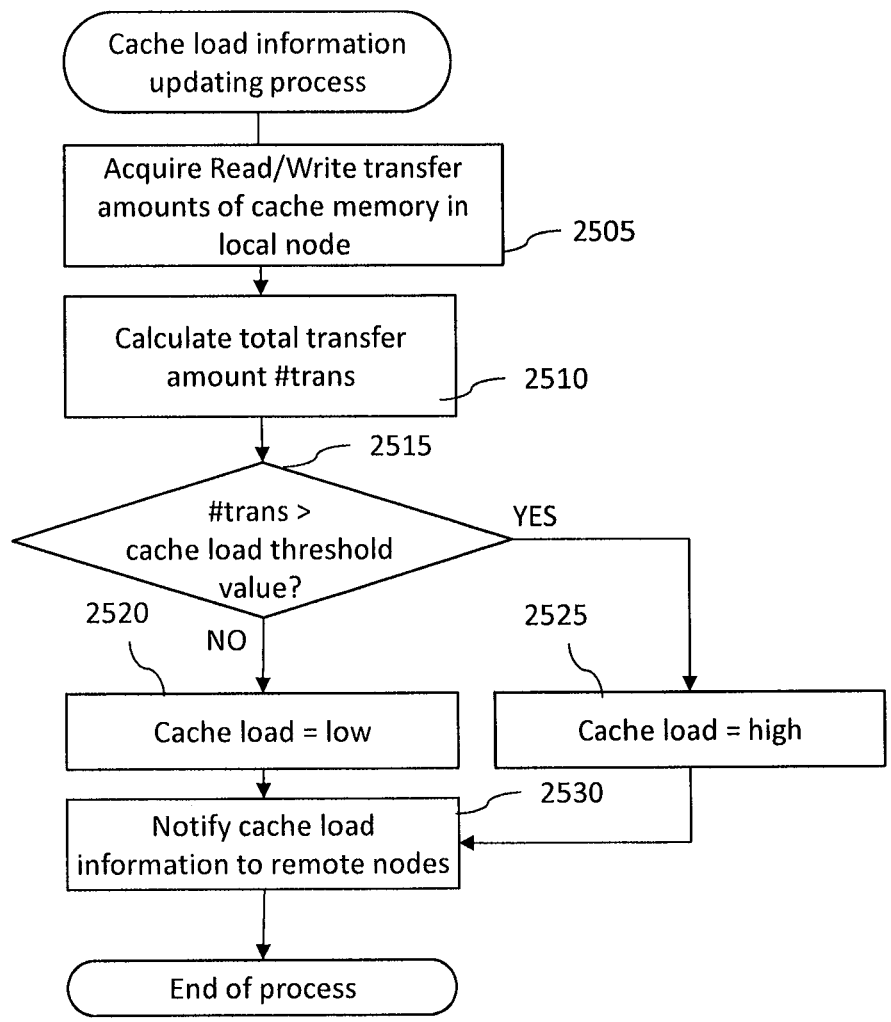
FIG. 26 illustrates a cache load information updating process.

FIG. 26 illustrates the cache load information updating process.

First, the evaluation value table updating program 0345 acquires the read transfer amount and the write transfer amount of the cache memory in the local node (2505). The read transfer amount and the write transfer amount may be measurement values of the latest period or average values of measurement values of a plurality of periods. Next, the evaluation value table updating program 0345 calculates a sum of the read transfer amount and the write transfer amount of the cache memory as a total transfer amount #trans (2010). Herein, in a case where the local node includes a plurality of cache memories, the evaluation value table updating program 0345 calculate a sum of the read transfer amount and the write transfer amount of the plurality of the cache memories. Next, the evaluation value table updating program 0345 determines whether or not the total transfer amount #trans is larger than a cache load threshold value (2515). If the total transfer amount #trans is larger than the cache load threshold value, the evaluation value table updating program 0345 determines that the cache load is high (2525); and if not, the evaluation value table updating program 0345 determines that the cache load is low (2520). Next, the message transfer program 0205 notifies cache load information as the result of determination of the cache load to all the other nodes (2530), and the flow is ended. Hereinbefore, the cache load information updating process is described.

In addition, the cache load information is received by the message reception program 0210, and the evaluation value table updating program 0345 updates the cache load information 1215 corresponding to the #CM_node in the evaluation value table of the local node with the received data.

Herein, the above-described free space amount information updating process 1627 will be described in detail.

The free space amount information updating process 1627 includes a process determining the free space amount information of the local node and notifying the other nodes of the free space amount information and a process receiving the free space amount information from the other nodes and updating the write evaluation value table 1200 of the local node.

Figure 27:
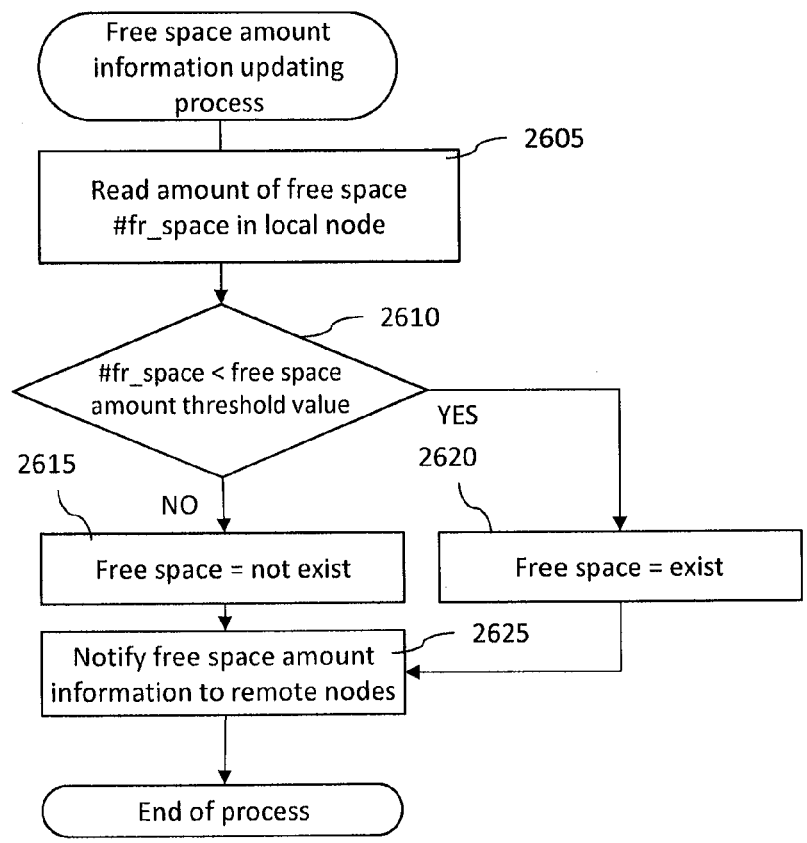
FIG. 27 illustrates a free space amount information updating process.

FIG. 27 illustrates the free space amount information updating process.

First, the evaluation value table updating program 0345 reads the amount of free space #fr_space of the capacity pool in the local node from the BE node configuration management table 0240 (2605). Next, the evaluation value table updating program 0345 determines whether or not the amount of free space #fr_space is smaller than the free space amount threshold value (2610). If the amount of free space #fr_space is larger than the free space amount threshold value, the evaluation value table updating program 0345 determines that an amount of free space exists (2620); and if not, the evaluation value table updating program 0345 determines that no amount of free space exists (insufficient) (2615). Next, the message transfer program 0205 notifies free space amount information as the result of determination of the amount of free space to all the other nodes (2625), and the flow is ended. Hereinbefore, the free space amount information updating process is described.

The free space amount information is received by the reception program 0210. Next, the evaluation value table updating program 0345 updates the free space amount information 1220 corresponding to the #BE_node in the evaluation value table of the local node with the received date.

The cache load information updating process and the free space amount information reception process may be periodically performed or may be performed in for times predetermined by read times and write times. In addition, all the nodes may be the object of change, and only the node which is changed by the updating may be updated.

According to the cache load information updating process and the free space amount information updating process described hereinbefore, the storage node 0105 can acquire the results of determinations of the cache load and the amount of free space of the other nodes while determining the cache load and the amount of free space of the local node. In addition, the local node state information r corresponds to the cache load information, the free space amount information, and the like which is transferred to remote nodes by the cache load information transfer process and the free space amount information transfer process. The remote node state information corresponds to the cache load information, the free space amount information, and the like which is received from the remote nodes by the cache load information reception process and the free space amount information reception process. In addition, the local node state information may be information indicating the cache load and the amount of free space of the local node, and the remote node state information may be information indicating the cache load and the amount of free space of the remote nodes. In this case, each node may determines based on the remote node state information whether or not the cache load of the remote nodes is equal to or smaller than a cache load threshold value and whether or not the amount of free space of the remote nodes is equal to or larger than an free space amount threshold value.

Hereinafter, the high-speed read control process will be described.

Figure 28:
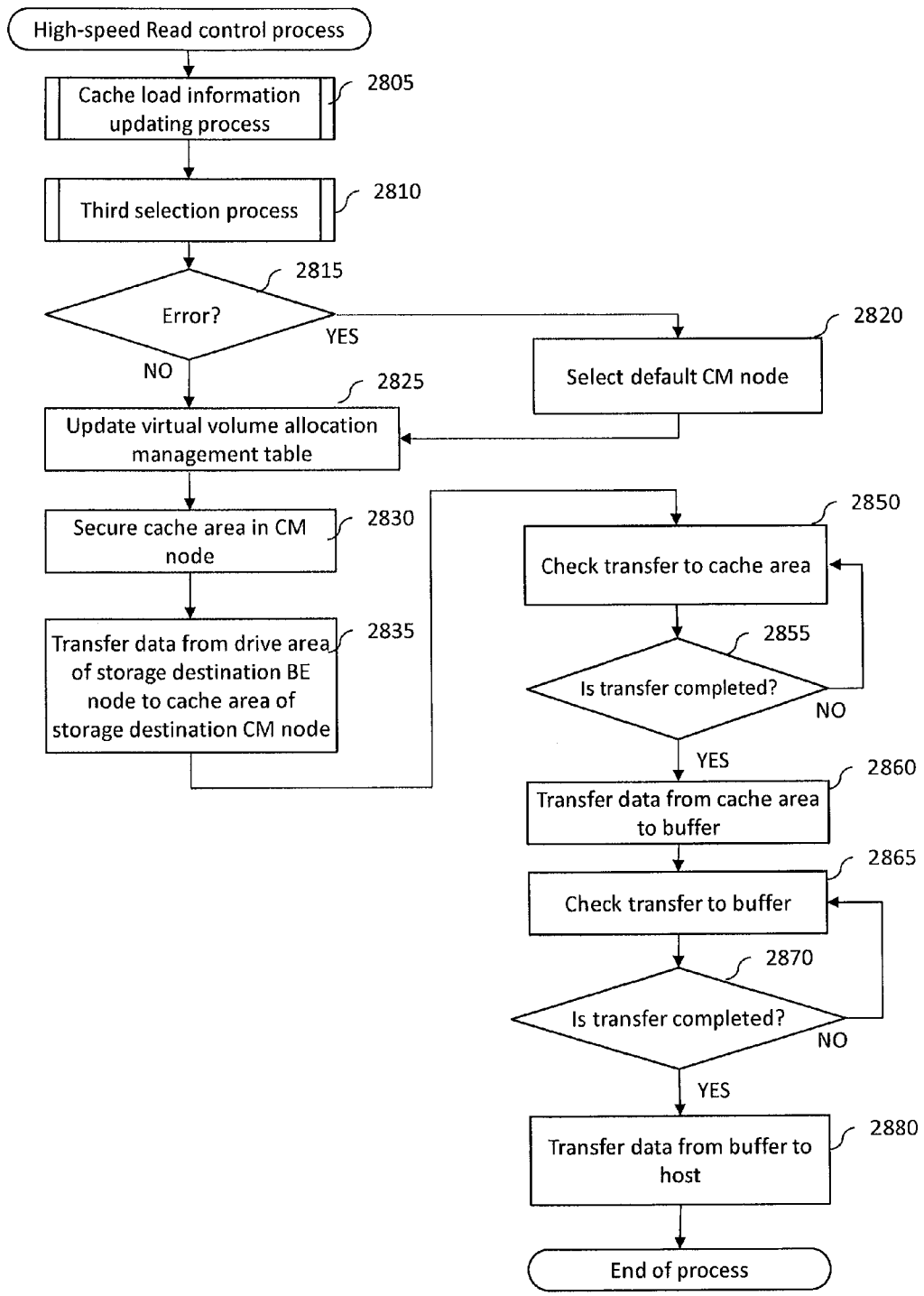
FIG. 28 illustrates a high-speed read control process.

FIG. 28 illustrates an example of the high-speed read control process.

Since the BE node has already been determined, the high-speed read control process is similar to the third high-speed write control process. However, the data transfer direction is reverse. Namely, in a case where the data after being written into the CM node and being written into the BE node (destage) are removed from the CM node, and after that, a read command of reading the data is received, so that the high-speed read process is performed.

First, the high-speed read control program 0325 performs a cache load information updating process which is similar to the processes 1625 and 1730 (2805). Next, the high-speed read control program 0325 performs a third selection process selecting an optimal CM node (2810) and determines whether or not error occurs in the process 1735 (2815). The third selection process is similar to the above-described second selection process except that a read evaluation value table is used instead of the write evaluation value table 1200. The read evaluation value table is different from the write evaluation value table in that the amount of free space 1220 of the BE node in the write evaluation value table 1200 does not need to be managed. In addition, the read data transfer direction is reverse to the write data transfer direction. However, in general, the number of transfer stages stored in the item 1225 is finally similar to that in the write evaluation value table. Therefore, the write evaluation value table may double as the read evaluation value table. However, in a case where failure or the like occurs in any one of the tables, since a different number of transfer stages may be considered, the above-mentioned tables may be separately managed. The read evaluation value table is created according to similar procedure as that of FIG. 25. The case that an error occurs denotes that no optimal CM node is found. Therefore, if an error occurs, the high-speed read control program 0325 selects a default CM node similarly to the process 1745 of the third high-speed write control process (2820).

If no error occurs, the high-speed read control program 0325 performs a third record updating process updating the record of the virtual storage area designated by the command in the virtual volume allocation management table 0230 (2825). The third record updating process is similar to the second record updating process. The difference between the two processes is the only Step S2310. In the second record updating process, the write destination virtual address #v_addr is extracted from the write command in Step S2310. However, in the third record updating process, the write destination virtual address #v_addr is extracted from the read command. Next, the high-speed read control program 0325 secures the cache area in the selected CM node (2830). Next, the high-speed read control program 0325 transfers data from the drive area of the storage destination BE node indicated in the record to the cache area of the storage destination CM node (2835). Next, the high-speed read control program 0325 checks the transfer to the cache area (2850) and determines whether or not the transfer to the cache area is completed (2855). If the transfer is completed, the high-speed read control program 0325 allows the flow to proceed to the process 2860. If the transfer is not completed, the high-speed read control program 0325 performs the checking in the process 2855 again. Next, the high-speed read control program 0325 transfers data from the cache area of the storage destination CM node to the buffer 0125 of the local node (2860). Next, the high-speed read control program 0325 checks the transfer to the buffer 0125 (2865) and determines whether or not the transfer to the buffer 0125 is completed (2870). If the transfer is completed, the high-speed read control program 0325 allows the flow to proceed to the process 2880. If the transfer is not completed, the high-speed read control program 0325 performs checking in the process 2865 again. Next, the high-speed read control program 0325 transfers data from the buffer 0125 to the host computer 0100 (2880), and the flow ends. Hereinbefore, the high-speed read control process is described.

According to the process, with respect to a read command reading the virtual storage area where releasing of allocation of the CM node is completed and allocation of the BE node is completed, the host node allocates the optimal CM node to the virtual storage area and reads the read data from the allocation-completed BE node, so that the read data can be transferred by the optimal path.

In addition to the above-described embodiment, in a specific case, the CM node and the BM node may be configured via the management computer 0172. The setting process will be described.

Figure 29:
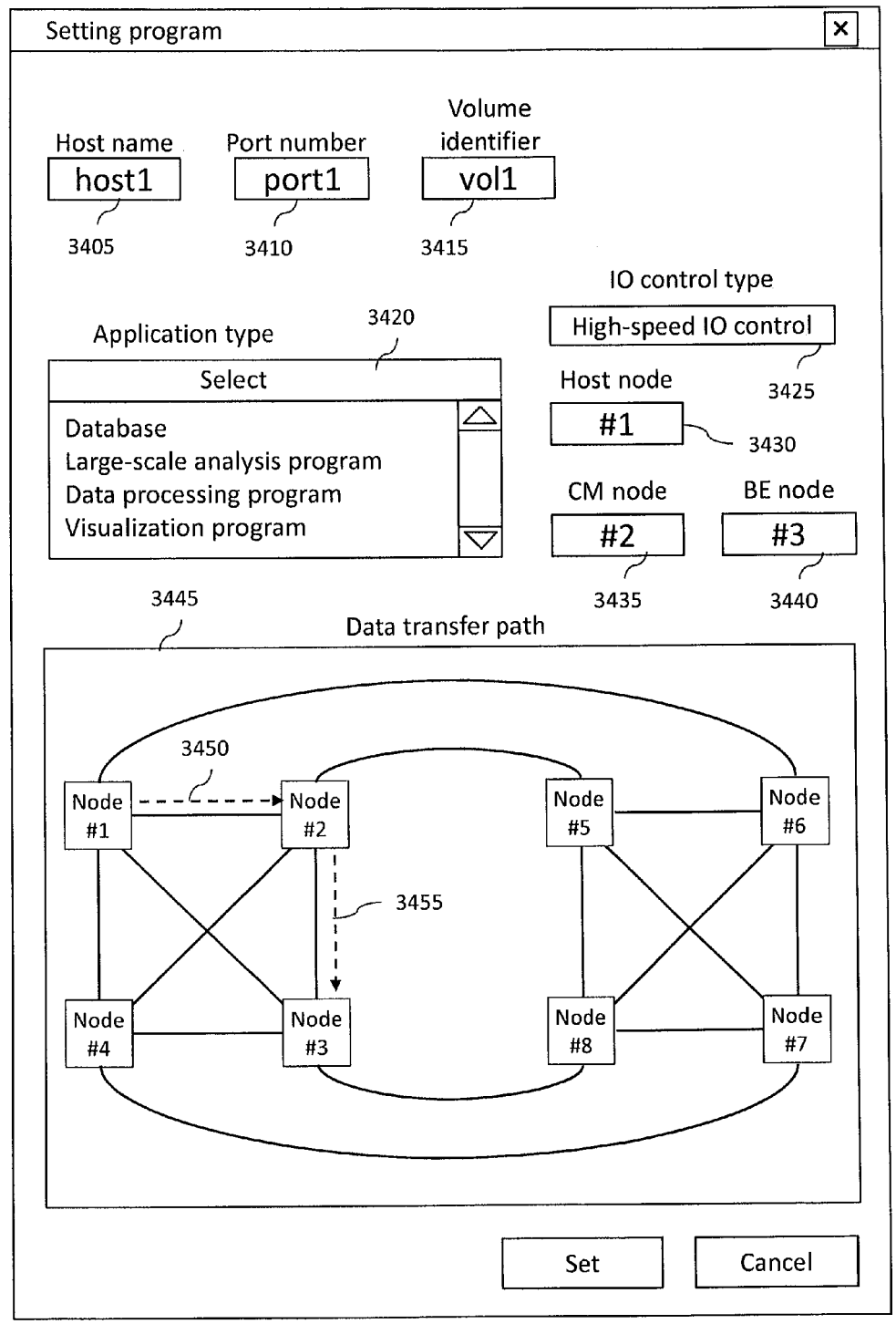
FIG. 29 illustrates a setting screen.

FIG. 29 illustrates an example of the setting screen.

The setting screen includes an edit box 3405 to which the host computer name indicating the host computer 0100 of the object of the IO control determination condition is input, and an edit box 3410 to which the port number of the port of the object is input, and an edit box 3415 to which the volume identifier of the virtual volume of the object is input. The setting screen further includes a drop-down list 3420 with which an application type of the application of the object in the host computer 0100 of the object is input. The setting screen further includes a drop-down list 3425 with which the IO control type is input. The IO control type is a high-speed IO control or a normal IO control. The setting screen further includes an edit box 3430 to which the number of the host node is input, an edit box 3435 to which the number of the CM node is input, and an edit box 3440 to which the BE node is input.

For example, in a case where the host computer name, the port number, and the volume identifier indicated in a command are appropriate for the values of the edit boxes 3405, 3410, and 3415, the IO control program 0315 controls data transfer paths so that the host node, the CM node, and the BE node are matched to the values of the edit boxes 3405, 3410, and 3415.

A manager of the storage system can configure which CM node and BE node are to be allocated using the setting screen with respect to a command including specific host name, port number, and volume identifier.

In addition, an access pattern may be configured in an application in advance, and the IO control type 3425 may be presented from the data transfer amount using the setting screen. The manager can perform setting the CM node and the BE node with reference to the presented IO control type. The setting information 0255 configured in this manner includes an IO control determination condition, and the IO control program 0315, the high-speed write control program 0320, and the high-speed read control program 0325 determine IO control based on the setting information 0255. In this case, the setting program 0361 of the management computer 0172 allows the display apparatus 192 to display the setting screen and performs a setting process producing the setting information 0371 based on the input from the input unit 193 and transmitting the setting information 0371 to a plurality of the storage nodes 0105 to store as the setting information 0255.

In addition, the above-described screen can be used to display a combination of the CM node and the BE node configured in the embodiment of the present invention.

The setting screen may further include a data transfer path 3445 so as to clarify the set data transfer path 3445.

Hereinafter, a storage system using a local cache and a dynamic capacity allocating function, to which the present invention is not applied, will be compared to the storage system 0102 according to the embodiment.

If a local cache is applied to a storage system having a dynamic capacity allocating function and a BE node is determined after the CM node is determined, since the BE node is not determined at the time of data writing, the local cache cannot be allocated.

If a local cache is applied to a storage system having a dynamic capacity allocating function and a CM node is determined after the BE node is determined, the local cache allocation is performed after the BE node is determined by the dynamic capacity allocating function. Namely, irrespective of the cache state, the cache is allocated to the BE node. At this time, data access is concentrated on the cache, and a large amount of data is transferred, so that the load of the cache may be increased. In this case, since the performance of data transfer from the host node to the CM node and performance of data transfer from the CM node to the BE node are deteriorated, the performance of the storage system may be deteriorated.

On the other hand, according to the embodiment, a combination of the CM and BE nodes where the times of passing through the network 0101 is small is selected from the candidates of the CM node satisfying the condition of the cache load and the candidates of the BE node satisfying the condition of the amount of free space, so that the consumption of the network band in the storage system 0102 is prevented and the performance of data access can be improved. Therefore, the deterioration in performance caused by the increase in number of nodes in the storage system 0102 having non-Any-to-any connection can be prevented, so that the performance scalability in proportion to the number of nodes can be implemented.

In addition, in a case where the network 0101 is of full duplex and the data transfer path during the write period and the data transfer path during the read period are the same, the write evaluation value table may be used as the read evaluation value table, and the read evaluation value table may be omitted.

In addition, in the above-described first, second, and third selection processes, instead of the evaluation values of the evaluation value table, the above-described topology information or the like and the connection information indicating the connection between a plurality of the storage nodes 0105 through the network 0101 may be used to select the CM node and the BE node where the number of times of data transfer through the network 0101 is minimum. In this case, the management computer 0172 may transmit the topology information to a plurality of the storage nodes 0105.

Second Embodiment

In the embodiment, a case where a plurality of the host computers shares a virtual volume will be described. Hereinafter, the description will be mainly made on the difference from the first embodiment.

Figure 30:
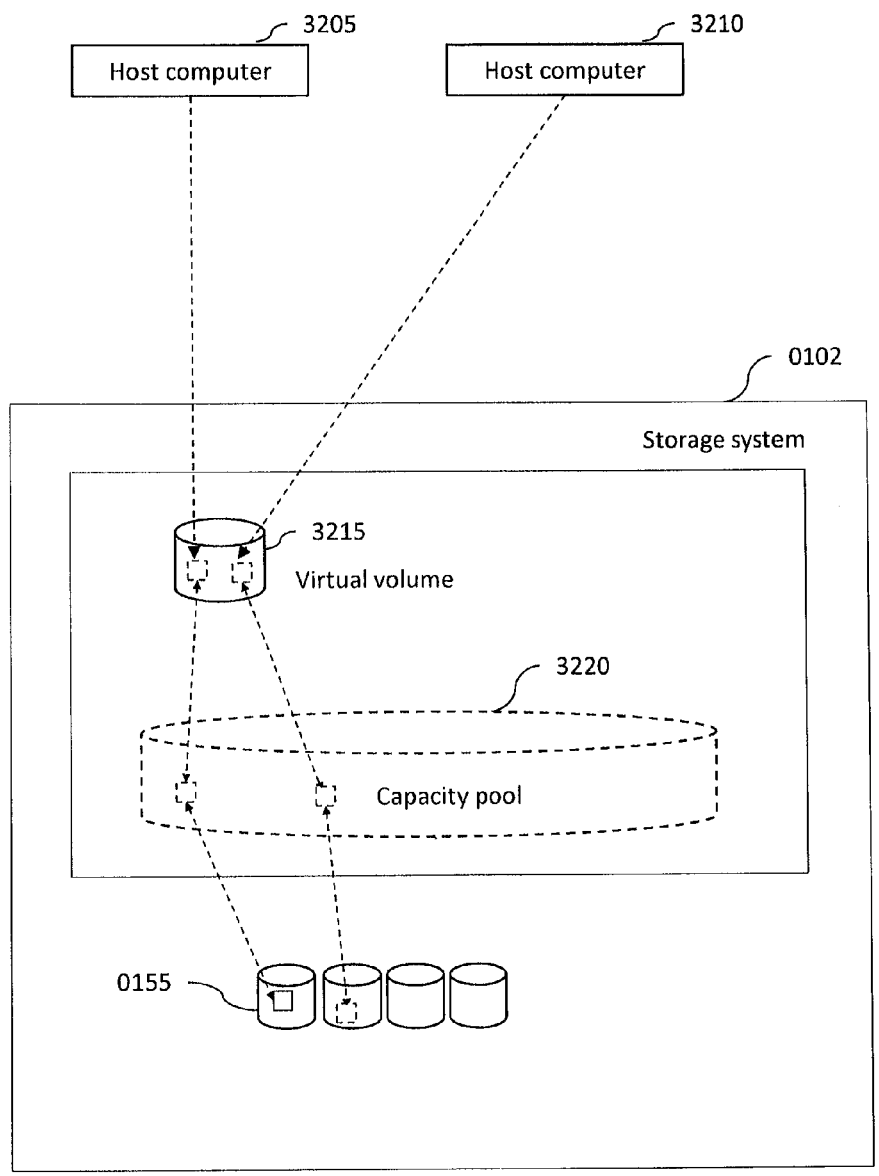
FIG. 30 schematically illustrates sharing of a virtual volume.

FIG. 30 schematically illustrates sharing of a virtual volume.

The host computers 3205 and 3210 share a virtual volume 3215 provided by the storage system 0102. Namely, there is a case where the host computers 3205 and 3210 perform data access on the same virtual volume 3215. Each of the host computers 3205 and 3210 corresponds to the host computer 0100 of the first embodiment. Three or more host computers may be used. Two or more virtual volumes may be used.

The storage node 0105 in the storage system 0102 receives a write command from any one of the host computers 3205 and 3210 to the virtual storage area in the virtual volume 3215 and the drive area is not allocated to the virtual storage area. In this case, the storage node 0105 receiving the write command extracts the drive area among the HDDs 0155 included in the RAID group allocated to the capacity pool 3220 and allocates the drive area to the virtual storage area.

In the embodiment, the high-speed write control program 0320 of the host node selects one host computer having the highest frequency of access to the virtual volume, determines the selected host computer as a representative host computer with respect to the virtual volume, and determines CM and BE nodes which optimize the data transfer path from the representative host computer. The conditions and method of determining the CM and BE nodes are similar to those of the first embodiment.

In addition, instead of the frequency of access, other access amounts such as read and write data transfer amounts with respect to the virtual volume may be used. In addition, in the embodiment, the high-speed write control program 0320 may determine the representative host computer for every page of the virtual volume besides the determination of the representative host computer in units of virtual volumes.

According to the embodiment, the host computer having the largest access amount is specified as the representative host computer among a plurality of the host computers which access to the virtual volume, and the optimal CM and BE nodes are selected based on the data access request from the representative host computer, so that the probability of data transfer by an optimal path can be improved, and the load of the network 0101 can be reduced.

The present invention is not limited to the embodiments described hereinbefore, but various changes or modifications can be available within the scope without departing from the spirit of the invention.

REFERENCE SIGNS LIST

0100 Host computer
0101 Network

0102 Storage system
0105 Storage node
0115 Data communication unit
0120 Local router
0125 Buffer
0130 Switch
0140 Memory
0150 Controller
0160 Storage medium unit
0170 Network for management
0172 Management computer
0250 Cache memory

The invention claimed is:

1. A storage system comprising at least three storage apparatuses, wherein
each of the storage apparatuses includes a processor coupled through a communication line to at least one of different storage apparatuses, a cache memory coupled to the processor, and a storage device coupled to the processor,
a processor of a first storage apparatus among the storage apparatuses is coupled to a host computer to supply a virtual volume to the host computer, and
in a case where the processor of the first storage apparatus receives a write request from the host computer as a request for data access to the virtual volume and a cache memory of any of the storage apparatuses is not allocated to a virtual storage area in the virtual volume designated by the data access request, the processor of the first storage apparatus selects a second storage apparatus and a third storage apparatus among candidates satisfying a predetermined state condition among the storage apparatuses based on connection information indicating connection between the storage apparatuses through the communication line in order to write write data designated by the data access request in a cache memory of the second storage apparatus among the storage apparatuses and to write the write data, which is written in the cache memory of the second storage apparatus, in a storage device of the third storage apparatus of the storage apparatuses.

2. A storage system according to claim 1, wherein the processor of the first storage apparatus selects a combination of the second storage apparatus and the third storage apparatus so as to cause the number of connections from the first storage apparatus through the second storage apparatus to the third storage apparatus to be the smallest.

3. A storage system according to claim 2, wherein the processor of the first storage apparatus selects some storage apparatuses, a data transfer amount of a cache memory of which, is smaller than a specific data transfer amount threshold value as candidates of the second storage apparatus among the storage apparatuses and selects the second storage apparatus among the candidates of the second storage apparatus.

4. A storage system according to claim 3, wherein the processor of the first storage apparatus selects some storage apparatuses, an amount of free space of the storage device of which, is larger than a specific free space amount threshold value as candidates of the third storage apparatus among the storage apparatuses and selects the third storage apparatus among the candidates of the third storage apparatus.

5. A storage system according to claim 4, wherein in a case where the processor of the first storage apparatus receives the write request, a data length of the write data is greater than a predetermined data length threshold value, and a cache memory of any of the storage apparatuses is not allocated to the virtual storage area in the virtual volume designated by the data access request, the processor of the first storage apparatus selects the second storage apparatus and the third storage apparatus.

6. A storage system according to claim 5, wherein in a case where the processor of the first storage apparatus receives the write request, the data length of the write data is greater than the data length threshold value, a cache memory of any of the storage apparatuses is not allocated to the virtual storage area, and a storage device of any of the storage apparatuses is not allocated to the virtual storage area, the processor of the first storage apparatus selects the second storage apparatus and the third storage apparatus so as to cause the number of times of passing of the write data through the communication line to be the smallest, based on the connection information among the storage apparatuses satisfying the state condition.

7. A storage system according to claim 6, wherein in a case where the processor of the first storage apparatus receives the write request, the data length of the write data is greater than the data length threshold value, a cache memory of any of the storage apparatuses is not allocated to the virtual storage area, and a storage device of any of the storage apparatuses is allocated to the virtual storage area, the processor of the first storage apparatus selects a storage apparatus including a storage device which is allocated to the virtual storage area as the third storage apparatus and selects the second storage apparatus so as to cause the number of times of passing of the write data through the communication line to be the smallest, based on the connection information among the storage apparatuses satisfying the state condition.

8. A storage system according to claim 7, wherein in a case where the processor of the first storage apparatus receives the write request, the data length of the write data is greater than the data length threshold value, a cache memory of any of the storage apparatuses is not allocated to the virtual storage area, and a storage device of any of the storage apparatuses is not allocated to the virtual storage area, after the processor of the first storage apparatus selects the third storage apparatus, the processor of the first storage apparatus reserves a storage area in the storage device of the third storage apparatus and instructs the host computer to transfer the write data.

9. A storage system according to claim 8, wherein in a case where the processor of the first storage apparatus receives the write request, the data length of the write data is greater than the data length threshold value, a cache memory of any of the storage apparatuses is allocated to the virtual storage area, and a storage device of any of the storage apparatuses is reserved for the virtual storage area, the processor of the first storage apparatus selects a storage apparatus including the cache memory which is allocated to the virtual storage area as the second storage apparatus and selects the storage apparatus including the reserved storage area as the third storage apparatus.

10. A storage system according to claim 9, wherein in a case where the processor of the first storage apparatus receives a read request as the data access request, a data length of the read data designated by the data access request is greater than the data length threshold value, a cache memory of any of the storage apparatuses is not allocated to the virtual storage area designated by the data access request, and a storage device of any of the storage apparatuses is allocated to the virtual storage area, the processor of the first storage apparatus selects the storage apparatus including the reserved storage area as the third storage apparatus and selects the second storage apparatus so as to cause the number of times of passing of the write data through the communication line to be the smallest, based on the connection information.

11. A storage system according to claim 4, wherein the processor of the first storage apparatus transmits local node state information indicating a state of a data transfer amount of a cache memory and an amount of free space of a storage device in the first storage apparatus, receives different node state information indicating a state of a data transfer amount of a cache memory and an amount of free space of a storage device in a storage apparatus other than the first storage apparatus among the storage apparatuses, and selects the second storage apparatus and the third storage apparatus based on the local node state information, the different node state information, and the connection information.

12. A storage system according to claim 11, wherein the processor of the first storage apparatus determines whether or not the data transfer amount of the cache memory in the first storage apparatus is smaller than the data transfer amount threshold value and whether or not the amount of free space of the storage device in the first storage apparatus is greater than the free space amount threshold value to define the local node state information and receives the different node state information indicating results of determination as to whether or not the data transfer amount of the cache memory in the storage apparatus other than the first storage apparatus among the storage apparatuses is smaller than the data transfer amount threshold value and determination as to whether or not the amount of free space of the storage device in the first storage apparatus is greater than the free space amount threshold value.

13. A storage system according to claim 12, wherein
the processor of the first storage apparatus determines whether or not the first storage apparatus satisfies the predetermined state condition and, in a case where the first storage apparatus satisfies the state condition, the processor of the first storage apparatus selects the first storage apparatus as the second storage apparatus and the third storage apparatus, and in a case where the first storage apparatus does not satisfy the state condition, the processor of the first storage apparatus selects the second storage apparatus and the third storage apparatus among the storage apparatuses other than the first storage apparatus among the storage apparatuses, and
the state condition is that the data transfer amount of the cache memory is smaller than the data transfer amount threshold value and the amount of free space of the storage device is larger than the free space amount threshold value.

14. A storage system according to claim 2, wherein in a case where a plurality of the host computers access the virtual volume, the processor of the first storage apparatus specifies a host computer having the largest access amount among the plurality of the host computers as a representative host computer and selects the second storage apparatus and the third storage apparatus based on a data access request from the representative host computer.

15. A storage system control method of controlling a storage system having at least three storage apparatuses, each of which includes a processor coupled through a communication line to at least one of different storage apparatuses, a cache memory coupled to the processor, and a storage device coupled to the processor,
the method comprising:
supplying, using a processor of a first storage apparatus among the storage apparatuses, a virtual volume to a host computer, the first storage apparatus being coupled to the host computer; and
in a case where the processor of a first storage apparatus receives a write request from the host computer as a request for data access to the virtual volume and a cache memory of any of the storage apparatuses is not allocated to a virtual storage area in the virtual volume designated by the data access request, selecting, using the processor of the first storage apparatus, a second storage apparatus and a third storage apparatus among candidates satisfying a predetermined state condition among the storage apparatuses based on connection information indicating connection between the storage apparatuses through the communication line in order to write write data designated by the data access request in a cache memory of the second storage apparatus among the storage apparatuses and to write the write data, which is written in the cache memory of the second storage apparatus, in a storage device of the third storage apparatus among the storage apparatuses.

* * * * *